(12) United States Patent
Charmot et al.

(10) Patent No.: US 7,030,187 B2
(45) Date of Patent: *Apr. 18, 2006

(54) CELLULOSE COPOLYMERS THAT MODIFY FIBERS AND SURFACES AND METHODS OF MAKING SAME

(75) Inventors: Dominique Charmot, Campbell, CA (US); Manikandan Jayaraman, San Francisco, CA (US); Han Ting Chang, Livermore, CA (US); Paul Mansky, San Francisco, CA (US); Wilfried Blokzijl, Bebington (GB)

(73) Assignee: Symyx Technologies, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/952,593

(22) Filed: Sep. 28, 2004

(65) Prior Publication Data

US 2005/0065283 A1    Mar. 24, 2005

Related U.S. Application Data

(63) Continuation of application No. 10/392,188, filed on Mar. 19, 2003, now Pat. No. 6,803,410, which is a continuation of application No. 09/910,099, filed on Jul. 20, 2001, now Pat. No. 6,596,809.

(51) Int. Cl.
*C08G 63/91* (2006.01)
(52) U.S. Cl. ............... 525/54.21; 525/54.2; 525/54.22; 525/54.23; 527/300
(58) Field of Classification Search ............... 525/54.2, 525/54.21, 54.22, 54.23; 527/300
See application file for complete search history.

(56) References Cited

U.S. PATENT DOCUMENTS

| 3,386,932 | A | * | 6/1968 | Steinmann | 527/301 |
| 4,206,108 | A | * | 6/1980 | Simms | 524/500 |
| 4,758,645 | A | * | 7/1988 | Miyazono et al. | 527/311 |
| 4,891,404 | A | * | 1/1990 | Narayan et al. | 525/54.2 |
| 6,153,705 | A | * | 11/2000 | Corpart et al. | 525/244 |

FOREIGN PATENT DOCUMENTS

| EP | 0 725 082 | 8/1996 |
| WO | WO 98/01478 | 1/1998 |
| WO | WO 98/15566 | 4/1998 |
| WO | WO 98/58974 | 12/1998 |
| WO | WO 99/14295 | 3/1999 |
| WO | WO 99/31144 | 6/1999 |
| WO | WO 99/35177 | 7/1999 |
| WO | WO 00/18860 | 4/2000 |
| WO | WO 00/18861 | 4/2000 |
| WO | WO 00/18862 | 4/2000 |

(Continued)

OTHER PUBLICATIONS

Author: Hawker et al. Publish Date: Publish Year:1999 vol.: 121 pp.: 3904-3920, Journal: J. Am. Chem. Soc., Title: Development of a Universal Alkoxyamine For "Living" Free Radical Polymerizations.

(Continued)

*Primary Examiner*—Samuel A. Acquah

(57) ABSTRACT

Cellulosic polymers, copolymers and grafts, are disclosed that adhere to fibers and surfaces during an aqueous treatment process. The cellulosic polymers having grafts and/or co-blocks are prepared using living-type free radical polymerization techniques, which provides control over the degree of substitution and graft/co-block composition and structure. These cellulosic polymers allow for the modification of fibers and surfaces to provide a desired effect.

2 Claims, 6 Drawing Sheets

FOREIGN PATENT DOCUMENTS

| WO | WO 00/22224 | 4/2000 |
| WO | WO 00/53640 | 9/2000 |
| WO | WO 00/60529 | 10/2000 |

OTHER PUBLICATIONS

Author: Bojanic et al. Publish Date: Publish Year:1996 vol.: 60 pp.: 1719-1725, Journal: J. Applied Polymer Science, Title: Synthesis and Electrochemistry of Grafted Copolymers of Cellulose with 4-Vinylpyridine, 1-Vinylimidazole, 1-Vinyl-2-pyrrolidinone, and 9-Vinylcarbazole.

Author: de Oliveira et al. Publish Date: Publish Year:1994 vol.: 35 pp.: 1977-1985, Journal: Polymer, Title: Multiphase Materials with Lignin: 13. Block Copolymers with Cellulose Propionate.

Author: de Oliveira et al. Publish Date: Publish Year:1994 vol.: I pp.: 77-86, Journal: Cellulose, Title: Novel Cellulose Derivatives. II. Synthesis and Characterics of Mono-Functional Cellulose Propionate Segments.

Author: Danielson et al. Publish Date: Publish Year:1986 vol.: 3 pp.: 363-377, Journal: Glycoconjugate J, Title: Immunochemical Characterization of Polylysine Conjugates Containing Reductively Aminated Cellulose, Oligosaccharides.

Author: Feger et al. Publish Date: Publish Year:1980 vol.: 3 pp.: 407-413, Journal: Polymer Bulletin, Title: Cellulose Containing Block Copolymers 1. Synthesis of Trimethylcellulose-(b-Poly(Oxytetramethylene))-Star Block, Copolymers.

Author: Feger et al. Publish Date: Publish Year:1982 vol.: 6 pp.: 321-326, Journal: Polymer Bulletin, Title: Cellulose Containing Block Copolymers 2. Molecular Weights and Solution Properties of Trimethylcellulose—Poly, (oxytetramethylene) Block Copolymers.

Author: Flugge et al. Publish Date: Publish Year:1999 vol.: 121 pp.: 7228-7238, Journal: J. Am. Chem. Soc., Title: Isolation, Modification, and NMR Assignments of a Series of Cellulose Oligomers.

Author: Kim et al. Publish Date: Publish Year:1976 vol.: A10(4) pp.: 671-679, Journal: J. Macromol. Sci-Chem, Title: Biodegradable Cellulose Block Copolymers.

Author: Kim et al. Publish Date: Publish Year:1973 vol.: 11 pp.: 731-735, Journal: Polymer Letters Edition, Title: A New Class of Biodegradable Polymers.

Author: Larm et al. Publish Date: Publish Year:1977 vol.: 58 pp.: 249-251, Journal: Carbohydrate Research, Title: Coupling of Proteins and Other Amines to Carbohydrate Polymers via Bromine Oxidation and Reductive Amination.

Author: McDowall et al. Publish Date: Publish Year:1984 vol.: 10 pp.: 1-50, Journal: Prog. Polym. Sci., Title: Grafting of Vinyl Monomers to Cellulose by Ceric Ion Initiation.

Author: www.extreme.glow Publish Date:Dec. 18, 2001 Publish Year:2001 vol.: pp. 1-2, Journal: Internet, Title: Peel-N-Stick Sheeting.

Author: Mezger et al. Publish Date: Publish Year:1983 vol.: 116 pp.: 13-27, Journal: Die Angewandte Makromolekulare Chemie, Title: Cellulose Containing Block Copolymers.

Author: Samal et al. Publish Date: Publish Year:1986 vol.: C26(1) pp.: 81-141, Journal: JMS-Rev. Macromol. Chem. Phys., Title: Graft Copolymerization of Cellulose, Cellulose Derivatives, and Lignocellulose.

Author: Steinmann Publish Date: Publish Year: vol.: pp.: 285-290, Journal: Book, Title: Elastomeric Fibers From Cellulose Triacetate.

Author: Waly et al. Publish Date: Publish Year:1996 vol.: 4 pp.: 53-60, Journal: Polymers & Polymer Composites, Title: Cellulose Thiocarbonate-Potassium Bromate Redox System-Initiated Graft Copolymerisation of Acrylic Esters on to Cotton Fabric.

Author: Zhang et al. Publish Date: Publish Year:1997 vol.: 66 pp.: 307-317, Journal: J. Applied Polymer Science, Title: Graft Copolymerization of Cellulose with Structopendant Unsaturated Ester Moieties in Homogeneous Solution.

Author: Arthur, J.C. Publish Date: Publish Year: vol.: pp.: 49-79, Journal: Book, Title: Chemical Modifications of Cellulose and its Derivatives.

Author: Klenn et al. Publish Date: Publish Year:1998 vol.: 2 pp.: 17-31, Journal: Wiley-VCH, Title: Comprehensive Cellulose Chemistry—Functionalization of Cellulose.

* cited by examiner

CELLULOSE COPOLYMERS THAT MODIFY FIBERS AND SURFACES AND METHODS OF MAKING SAME

This application is a continuation application of U.S. Ser. No. 10/392,188 filed Mar. 19, 2003, now U.S. Pat. No. 6,803,410 which is a continuation application of U.S. Ser. No. 09/910,099 filed Jul. 20, 2001 and now issued as U.S. Pat. No. 6,596,809, both of which are incorporated herein by reference.

FIELD OF THE INVENTION

The present invention relates to novel polymers that are based on a cellulose backbone and grafted with a controlled number of grafts of controlled length. These novel polymers are prepared by radical polymerization techniques, which can control the architecture of the polymer.

BACKGROUND OF THE INVENTION

The grafting of synthetic polymers onto a cellulosic backbone has been the subject of research activities for a long time. The hope is to capture the benefits of a polymer that has properties of both cellulose and the synthetic polymers. Enormous research and development efforts have occurred over the last 40 years, but no commercializable polymer or process has yet been discovered, despite optimistic predictions.

The grafting of polymers on a cellulosic backbone proceeds through radical polymerization wherein an ethylenic monomer is contacted with a soluble or insoluble cellulosic material together with a free radical initiator. The radical thus formed reacts on the cellulosic backbone (usually by proton abstraction), creates radicals on the cellulosic chain, which subsequently react with monomers to form graft chains on the cellulosic backbone. Related techniques use other sources of radical such high energy irradiation or oxydising agents such as Cerium salt, or redox system such as thiocarbonate-potassium bromate. These method are well known, see, e.g., Mc Donald, et al. *Prog. Polym. Sci.* 1984, 10,1; Hebeish et al. "*The Chemistry and Technology of cellulosic copolymers*", (Springer Verlag, 1981); Samal et al. *J. Macromol. Sci-Rev. Macromol. Chem,* 1986, 26, 81; Waly et al, *Polymers & polymer composites* 4,1,53, 1996; and D. Klenn et al., *Comprehensive Cellulose Chemistry*, vol. 2 "Functionalization of Cellulose" pp. 17–31 (Wiley-VCH, Weinheim, 1998); each of which is incorporated herein by reference.

Another strategy involves functionalizing the cellulose backbone with a reactive double bond and polymerizing in presence of monomers under conventional free radical polymerization conditions, see, e.g., U.S. Pat. No. 4,758,645. Alternatively a free radical initiator is covalently linked to the polysaccharide backbone to generate a radical from the backbone to initiate polymerization and form graft copolymers (see, e.g., Bojanic V, *J, Appl. Polym. Sci.,* 60, 1719–1725, 1996 and Zheng et al, ibid, 66, 307–317, 1997). For example, in U.S. Pat. No. 4,206,108, a thiol is covalently bound to a polymeric backbone with pendent hydroxy groups via an urethane linkage; this polymer containing mercapto groups is reacted with ethylenically unsaturated monomers to form the graft copolymer.

However, none of these techniques lead to a well-defined material with a controlled macrostructure and microstructure. For instance none of these techniques lead to a good control of both the number of grafts chains per cellulose backbone molecule and molecular weight of the graft chains. Moreover side reactions are difficult, if not impossible, to avoid, including the formation of un-grafted polymer, graft chain degradation and/or crosslinking of the grafted chains.

To solve these problems, pre-formed chains have been chemically grafted onto cellulosic polymers. For instance, in U.S. Pat. No. 4,891,404 polystyrene chains were grown in an anionic polymerization and capped with, e.g., $CO_2$. These grafts were then attached to mesylated or tosylated cellulose triacetate by nucleophilic displacement. This method is difficult to commercialize because of the stringent conditions required by the method. Moreover, the set of monomers that can be used in this method is restricted to non-polar olefins, namely precluding any application in water media.

Block copolymers based on cellulose esters have been reported. See, e.g., Oliveira et al, *Polymer,* 35, 9, 1994; Feger et al, *Polymer Bulletin,* 3, 407, 1980; Feger et al, Ibid, 6, 321, 1982; U.S. Pat. No. 3,386,932; Steinmann, *Polym. Preprint, Am. Chem. Soc. Div. Polym. Chem.* 1970, 11, 285; Kim et al., *J. Polym. Sci. Polym. Lett. Ed.,* 1973, 11, 731; and Kim et al., *J. Macromol. Sci., Chem.* (A) 1976, 10, 671, each of which is incorporated herein by reference. A major problem with these references is the generation of considerable chain branching, grafting or crosslinking. Mezger et al., *Angew. Makromol. Chem.,* 116, 13, 1983 prepared oligomeric monohydroxy-terminated cellulose coupled with 4–4'diphenyl-disocyanate, which was then used as a UV-macro-photo-initiator to prepare triblock copolymers. The reaction is known as the iniferter technique and uses UV initiation, which limits its applicability to certain processing methods and furthermore is typically applicable to styrenic and methacrylic monomers. Other monomers, such as acrylics, vinyl acetate, acrylamide type monomers, which are in widespread use in waterborne systems, might require another technique.

Previously, it has been recognized in the art that cellulose based materials adhere to cotton fibers. For example, WO 00/18861 and WO 00/18862 disclose cellulosic compounds having a benefit agent attached, so that the benefit agent will be attached to the fiber. See also WO 99/14925. However, the ability of cellulose based materials to adhere has not been fully investigated, and a need exists to find cellulosic based materials that are of commercial significance.

Therefore, there is a strong need to develop a process that makes it possible to prepare either block or grafted materials from cellulosic polymers, with a predictable number of blocks or graft chains per cellulosic backbone in a waterborne system. These blocks and graft chains should be controlled in length and chemical composition. Moreover, the method of synthesis should be commercializable. Furthermore, a need exists to provide benefits to fibers and surfaces.

SUMMARY OF THE INVENTION

This invention solves, at least in part, these needs by providing a process that can be implemented under conditions similar to conventional polymerization, which is applicable to a large of variety of hydrophilic and hydrophobic monomers. This invention provides a living or controlled free radical method of preparing cellulosic graft polymers by attaching a free radical control agent to a controlled number of sites on a cellulose backbone, where the cellulose backbone has been sized to a desired degree of polymerization. The grafts are then grown to a desired size using living-type kinetics, with the grafts being chosen from a wide variety of one or more monomers. When the grafts are located at one or more terminal end portions of the cellulosic backbone, then the polymers are considered herein to be block copolymers.

The cellulosic grafted and copolymeric materials of this invention with well-defined macromolecular features find utility in a wide field of applications. In particular, due to their segmented structures, these polymers have applicability as compatibilizers between naturally occurring bio-polymers such as starch or cellulose with synthetic thermoplastic resins, so-called biodegradable bio-plastics.

Furthermore, the polymers of this invention may be water soluble, or at least water-dispersible (e.g., water swellable). In some of these embodiments, the cellulosic moiety is known to adsorb to cellulosic surface, such as cotton or paper, which then alter the surface or interface of cotton/paper and bring new benefits to the fiber or surface.

The process of this invention has a number of benefits, which can be considered objects of this invention, including (1) control of the molecular weight of the cellulosic backbone through the depolymerization process, (2) little or no significant side reactions that leads to crosslinking or chain severing of the cellulosic backbone, (3) control of the grafting site density, (4) control of the graft or block length, (5) minimization of ungrafted material, and (6) control of the graft or block chemical composition (e.g., high chain homogeneity as compared to conventional free radical processes).

It is another aspect and object of this invention to provide cellulosic backbone polymers that have a controlled degree of graft substitution.

It is an object of this invention to prepare cellulosic graft polymers by growing grafts with living kinetics from a cellulosic backbone.

It is another object of this invention to provide a method of preparing cellulosic graft polymers.

It is yet another object of this invention to provide cellulosic graft polymers that adhere to fibers or surfaces, preferably in the presence of water.

It is a further object of this invention to modify a cotton or paper fiber or surface in an aqueous treatment step.

It is still a further object of this invention to modify a cotton or paper fiber or surface with a cellulosic graft polymer having known properties.

Further aspects and objects of this invention will be evident to those of skill in the art upon review of this specification.

DETAILED DESCRIPTION OF THE INVENTION

Figure 1:
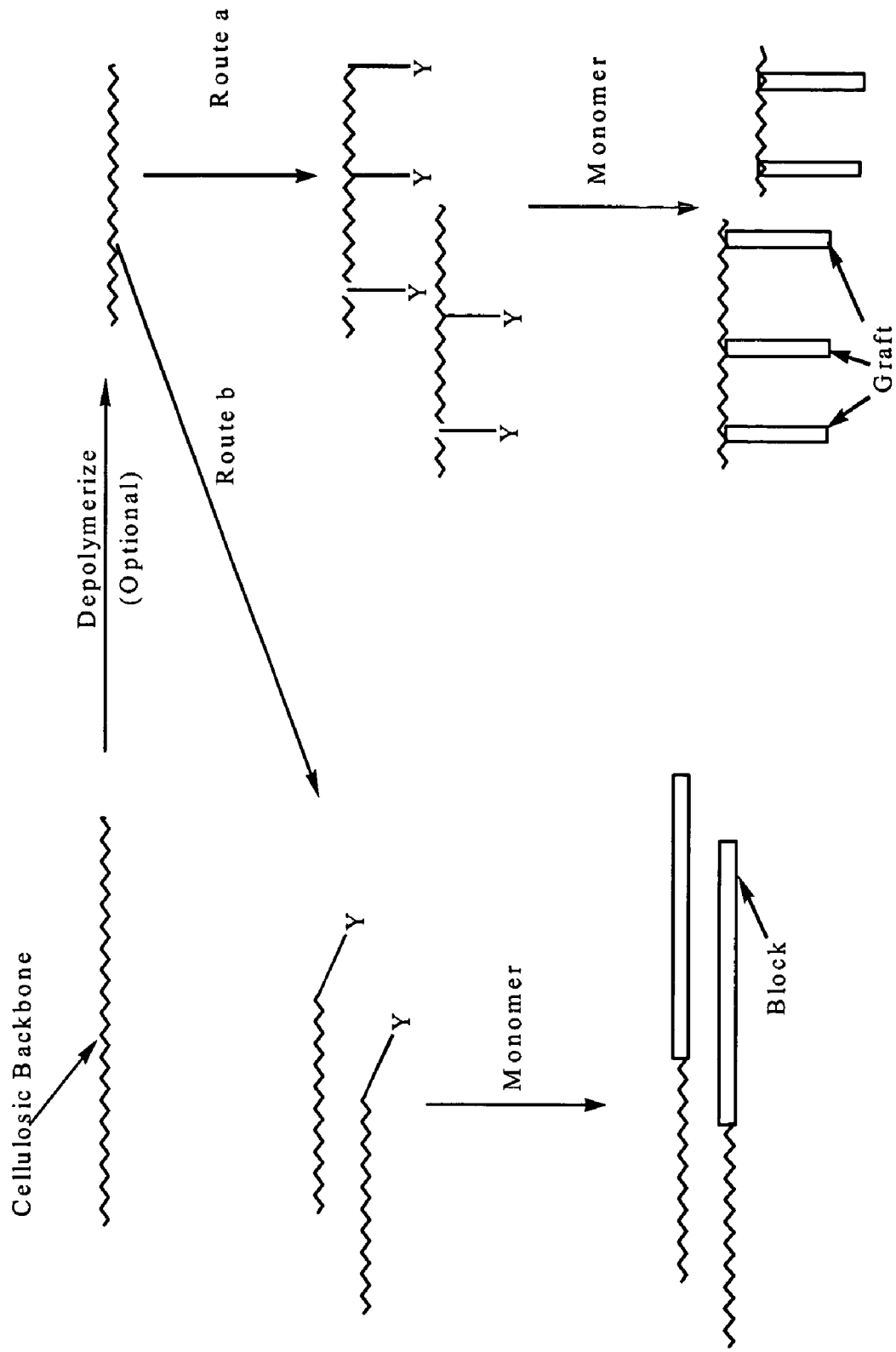
FIG. 1 is a schematic drawing of the processes of this invention for preparation of grafted cellulosic materials and copolymeric materials.

This invention applies living-type kinetics to the grafting of synthetic polymers to cellulosic polymeric backbones. This novel methodology leads to the production of controlled architecture graft copolymers having unique properties. At least one of the unique properties discovered has been a graft cellulosic polymer that adheres to a fiber or surface during an aqueous treating step. In particular it has been found that the cellulose graft polymers of the current invention adhere to cotton fibers during an aqueous treatment step and are not removed during subsequent treatment of the cotton fibers. Thus, the cellulosic polymers of the present invention find utility in modifying fibers or surfaces (e.g., cotton or paper) to impart a benefit, such as hydrophilicity, hydrophobicity, oleophobicity, adhesion, sensory effects, wetability, lubrication, tensile strength, preservation, anti-staining properties, etc. The imparted benefit can be chosen depending on the intended use of the fiber or surface. Those skilled in the art will understand that additional utilities, such as those mentioned above, are readily apparent.

It is to be understood that the terminology used herein is for the purpose of describing particular embodiments only, and is not intended to be limiting. As used in this specification and the appended claims, the singular forms "a,", "an" and "the" include plural referents unless the context clearly dictates otherwise. In describing and claiming the present invention, the following terminology will be used in accordance with the definitions set out below. These definitions are intended to supplement and illustrate, not preclude, the definitions known to those of skill in the art.

The following definitions pertain to chemical structures, molecular segments and substituents:

As used herein, the phrase "having the structure" is not intended to be limiting and is used in the same way that the term "comprising" is commonly used. The term "independently selected from the group consisting of" is used herein to indicate that the recited elements, e.g., R groups or the like, can be identical or different (e.g., $R^2$ and $R^3$ in the structure of formula (1) may all be substituted alkyl groups, or $R^2$ may be hydrido and $R^3$ may be methyl, etc.).

"Optional" or "optionally" means that the subsequently described event or circumstance may or may not occur, and that the description includes instances where said event or circumstance occurs and instances where it does not. For example, the phrase "optionally substituted hydrocarbyl" means that a hydrocarbyl moiety may or may not be substituted and that the description includes both unsubstituted hydrocarbyl and hydrocarbyl where there is substitution.

The term "alkyl" as used herein refers to a branched or unbranched saturated hydrocarbon group typically although not necessarily containing 1 to about 24 carbon atoms, such as methyl, ethyl, n-propyl, isopropyl, n-butyl, isobutyl, t-butyl, octyl, decyl, and the like, as well as cycloalkyl groups such as cyclopentyl, cyclohexyl and the like. Generally, although again not necessarily, alkyl groups herein contain 1 to about 12 carbon atoms. The term "lower alkyl" intends an alkyl group of one to six carbon atoms, preferably one to four carbon atoms. "Substituted alkyl" refers to alkyl substituted with one or more substituent groups, and the terms "heteroatom-containing alkyl" and "heteroalkyl" refer to alkyl in which at least one carbon atom is replaced with a heteroatom.

The term "alkenyl" as used herein refers to a branched or unbranched hydrocarbon group typically although not necessarily containing 2 to about 24 carbon atoms and at least one double bond, such as ethenyl, n-propenyl, isopropenyl, n-butenyl, isobutenyl, octenyl, decenyl, and the like. Generally, although again not necessarily, alkenyl groups herein contain 2 to about 12 carbon atoms. The term "lower alkenyl" intends an alkenyl group of two to six carbon atoms, preferably two to four carbon atoms. "Substituted alkenyl" refers to alkenyl substituted with one or more substituent groups, and the terms "heteroatom-containing alkenyl" and "heteroalkenyl" refer to alkenyl in which at least one carbon atom is replaced with a heteroatom.

The term "alkynyl" as used herein refers to a branched or unbranched hydrocarbon group typically although not necessarily containing 2 to about 24 carbon atoms and at least one triple bond, such as ethynyl, n-propynyl, isopropynyl, n-butynyl, isobutynyl, octynyl, decynyl, and the like. Generally, although again not necessarily, alkynyl groups herein contain 2 to about 12 carbon atoms. The term "lower alkynyl" intends an alkynyl group of two to six carbon atoms, preferably three or four carbon atoms. "Substituted alkynyl" refers to alkynyl substituted with one or more substituent groups, and the terms "heteroatom-containing alkynyl" and "heteroalkynyl" refer to alkynyl in which at least one carbon atom is replaced with a heteroatom.

The term "alkoxy" as used herein intends an alkyl group bound through a single, terminal ether linkage; that is, an "alkoxy" group may be represented as —O-alkyl where alkyl is as defined-above. A "lower alkoxy" group intends an alkoxy group containing one to six, more preferably one to four, carbon atoms. The term "aryloxy" is used in a similar fashion, with aryl as defined below.

Similarly, the term "alkyl thio" as used herein intends an alkyl group bound through a single, terminal thioether linkage; that is, an "alkyl thio" group may be represented as —S-alkyl where alkyl is as defined above. A "lower alkyl thio" group intends an alkyl thio group containing one to six, more preferably one to four, carbon atoms.

The term "allenyl" is used herein in the conventional sense to refer to a molecular segment having the structure —CH═C═CH$_2$. An "allenyl" group may be unsubstituted or substituted with one or more non-hydrogen substituents.

The term "aryl" as used herein, and unless otherwise specified, refers to an aromatic substituent containing a single aromatic ring or multiple aromatic rings that are fused together, linked covalently, or linked to a common group such as a methylene or ethylene moiety. The common linking group may also be a carbonyl as in benzophenone, an oxygen atom as in diphenylether, or a nitrogen atom as in diphenylamine. Preferred aryl groups contain one aromatic ring or two fused or linked aromatic rings, e.g., phenyl, naphthyl, biphenyl, diphenylether, diphenylamine, benzophenone, and the like. In particular embodiments, aryl substituents have 1 to about 200 carbon atoms, typically 1 to about 50 carbon atoms, and preferably 1 to about 20 carbon atoms. "Substituted aryl" refers to an aryl moiety substituted with one or more substituent groups, (e.g., tolyl, mesityl and perfluorophenyl) and the terms "heteroatom-containing aryl" and "heteroaryl" refer to aryl in which at least one carbon atom is replaced with a heteroatom.

The term "aralkyl" refers to an alkyl group with an aryl substituent, and the term "aralkylene" refers to an alkylene group with an aryl substituent; the term "alkaryl" refers to an aryl group that has an alkyl substituent, and the term "alkarylene" refers to an arylene group with an alkyl substituent.

The terms "halo" and "halogen" are used in the conventional sense to refer to a chloro, bromo, fluoro or iodo substituent. The terms "halo alkyl," "haloalkenyl" or "haloalkynyl" (or "halogenated alkyl," "halogenated alkenyl," or "halogenated alkynyl") refers to an alkyl, alkenyl or alkynyl group, respectively, in which at least one of the hydrogen atoms in the group has been replaced with a halogen atom.

The term "heteroatom-containing" as in a "heteroatom-containing hydrocarbyl group" refers to a molecule or molecular fragment in which one or more carbon atoms is replaced with an atom other than carbon, e.g., nitrogen, oxygen, sulfur, phosphorus or silicon. Similarly, the term "heteroalkyl" refers to an alkyl substituent that is heteroatom-containing, the term "heterocyclic" refers to a cyclic substituent that is heteroatom-containing, the term "heteroaryl" refers to an aryl substituent that is heteroatom-containing, and the like. When the term "heteroatom-containing" appears prior to a list of possible heteroatom-containing groups, it is intended that the term apply to every member of that group. That is, the phrase "heteroatom-containing alkyl, alkenyl and alkynyl" is to be interpreted as "heteroatom-containing alkyl, heteroatom-containing alkenyl and heteroatom-containing alkynyl."

"Hydrocarbyl" refers to univalent hydrocarbyl radicals containing 1 to about 30 carbon atoms, preferably 1 to about 24 carbon atoms, most preferably 1 to about 12 carbon atoms, including branched or unbranched, saturated or unsaturated species, such as alkyl groups, alkenyl groups, aryl groups, and the like. The term "lower hydrocarbyl" intends a hydrocarbyl group of one to six carbon atoms, preferably one to four carbon atoms. "Substituted hydrocarbyl" refers to hydrocarbyl substituted with one or more substituent groups, and the terms "heteroatom-containing hydrocarbyl" and "heterohydrocarbyl" refer to hydrocarbyl in which at least one carbon atom is replaced with a heteroatom.

By "substituted" as in "substituted hydrocarbyl," "substituted aryl," "substituted alkyl," "substituted alkenyl" and the like, as alluded to in some of the aforementioned definitions, is meant that in the hydrocarbyl, hydrocarbylene, alkyl, alkenyl or other moiety, at least one hydrogen atom bound to a carbon atom is replaced with one or more substituents that are functional groups such as hydroxyl, alkoxy, thio, phosphino, amino, halo, silyl, and the like. When the term "substituted" appears prior to a list of possible substituted groups, it is intended that the term apply to every member of that group. That is, the phrase "substituted alkyl, alkenyl and alkynyl" is to be interpreted as "substituted alkyl, substituted alkenyl and substituted alkynyl." Similarly, "optionally substituted alkyl, alkenyl and alkynyl" is to be interpreted as "optionally substituted alkyl, optionally substituted alkenyl and optionally substituted alkynyl."

As used herein the term "silyl" refers to the —SiZ$^1$Z$^2$Z$^3$ radical, where each of Z$^1$, Z$^2$, and Z$^3$ is independently selected from the group consisting of hydrido and optionally substituted alkyl, alkenyl, alkynyl, aryl, aralkyl, alkaryl, heterocyclic, alkoxy, aryloxy and amino.

As used herein, the term "phosphino" refers to the group —PZ$^1$Z$^2$, where each of Z$^1$ and Z$^2$ is independently selected from the group consisting of hydrido and optionally substituted alkyl, alkenyl, alkynyl, aryl, aralkyl, alkaryl, heterocyclic and amino.

The term "amino" is used herein to refer to the group —$NZ^1Z^2$, where each of $Z^1$ and $Z^2$ is independently selected from the group consisting of hydrido and optionally substituted alkyl, alkenyl, alkynyl, aryl, aralkyl, alkaryl and heterocyclic.

The term "thio" is used herein to refer to the group —$SZ^1$, where $Z^1$, is selected from the group consisting of hydrido and optionally substituted alkyl, alkenyl, alkynyl, aryl, aralkyl, alkaryl and heterocyclic.

As used herein all reference to the elements and groups of the Periodic Table of the Elements is to the version of the table published by the Handbook of Chemistry and Physics, CRC Press, 1995, which sets forth the new IUPAC system for numbering groups.

The term "degree of substitution" (or DS) is used herein to refer to substitution of the three hydroxyl groups on the repeating anhydroglucose unit. DS thus takes at least two forms in this application. In one form, the DS is considered with respect to a single sugar unit, and thus, the maximum degree of substitution is 3 on any single sugar unit. In this first form, DS values do not generally relate to the uniformity of substitution of chemical groups along the cellulose molecule and are not related to the molecular weight of the cellulose backbone, unless otherwise specified. In the second form, DS refers to the average number of substitution on all sugar units across a bulk sample of graft or block copolymer. In this second form, the DS is typically less than 1 and is typically experimentally determined as discussed herein. Also in this second form, the DS is included in the simple equation {(Mw backbone/Mw sugar unit)× DS}=number of grafts. Upon review of this specification, the different usages of DS will be apparent to those of skill in the art.

"Cellulose triacetate" refers to a molecule that has acetate esters in a degree of substitution of about 2.7 to 3. "Cellulose monoacetate" refers to a molecule that has acetate esters in a degree of substitution of about 1.1 or less, preferable about 1.1 to about 0.5.

Processes for Polymer Synthesis:

The invention herein, in one aspect, is a cellulosic graft polymer as described below. Upon identification of the polymer having desired properties and/or structure, those of skill in the art will recognize various methods for producing such polymers. The various methods include production of telechelic grafts and subsequent attachment to a cellulosic backbone and attachment of control agents or initiators to the cellulosic backbone for the free radical polymerization of the graft segments (preferably in a living or controlled manner). In another aspect, the invention is a cellulosic copolymer, which is prepared from control agents for the living or controlled free radical polymerization of monomers into blocks. The preferred method of production of these two categories of polymers is generally shown in FIG. 1. As shown therein, a cellulosic starting material (e.g., cellulosic backbone) is optionally first depolymerized to a desired size. Then following route a in FIG. 1, initiator control agents (designated herein as Y) are attached to at least some middle portions of the cellulosic material. Following route b in FIG. 1, initiator-control agents are attached to at least one terminal end portion of the cellulosic backbone. Desired one or more monomers are then polymerized in a controlled or living-type free radical method to yield cellulosic backbone graft polymers from route a and block copolymers from route b, with the rectangular blocks representing the graft or block polymer segments.

Figure 2:
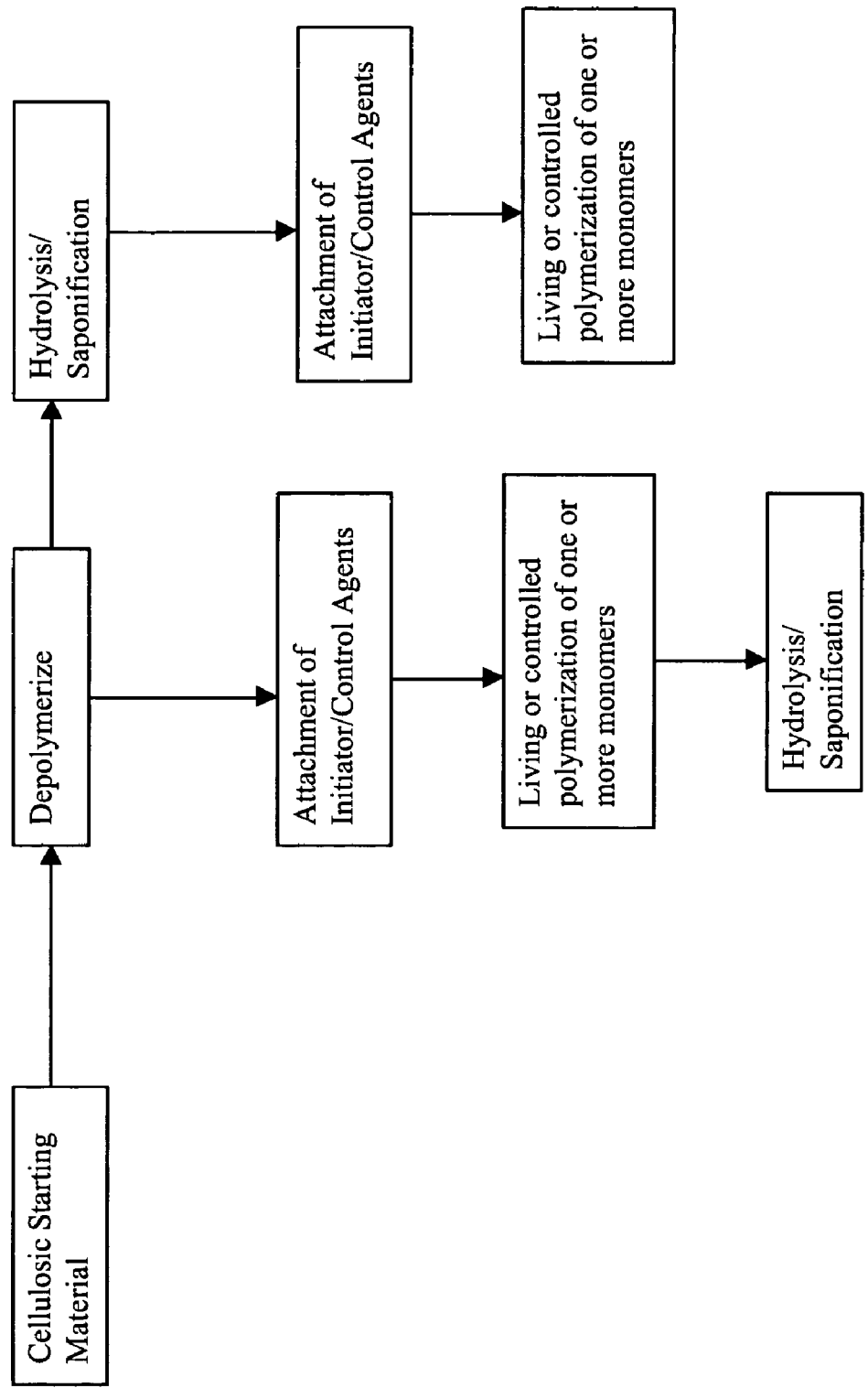
FIG. 2 is a block diagram showing the various routes for employing hydrolysis or saponification in the preparation of cellulosic grafted or copolymeric materials.

FIG. 2 shows the processes for synthesis of the polymers of this invention in block diagram form. As shown in FIG. 2, the cellulosic starting material is optionally, but typically, depolymerized to obtain a cellulosic material having a desired size. Thereafter, the process proceeds in one of two routes. In a first route, after depolymerization the cellulosic material is optionally subjected to hydrolysis or saponification, depending on the starting material. The purpose of hydrolysis or saponification is to make the cellulosic material more water soluble (or at least water dispersible by reducing the degree of substitution, as explained more fully below). Following the same first route, the cellulosic material is substituted with one or more initiator-control agents. The substituted material is then subjected to polymerization conditions with one or more monomers or choice in order to polymerize the one or more monomers at the points of attachment of the initiator control agents. This polymerization step is preferably performed under living or controlled type kinetics (although some loss of control is conceivable). The alternative second route shown in FIG. 2 is where the hydrolysis or saponification step is performed after the polymerization step and is an alternative depending on the starting cellulosic material.

Therefore, cellulosic-based polymers, which are an object of this invention, can be prepared according to the general schemes indicated in FIG. 2. Basically they can be graft copolymers composed of a cellulosic backbone and synthetic polymeric chains grafted to it, or block copolymers wherein the cellulosic segment is linked to another synthetic polymeric chain at either one or both ends. Block copolymers are prepared according the same scheme with the exception that the control agents are selectively anchored to the termini of the cellulosic chains.

Depolymerization

The polymers of this invention generally have a cellulosic backbone selected from the group consisting of cellulose, modified cellulose and hemi-cellulose. Modified cellulose and hemi-cellulose are used herein consistently with as those of skill in the art would use such terms, including for example, a cellulosic materials having at least some β-1,4-linked glucose units in the backbone, such as mannan, glucomannan and xyloglucan. The cellulosic backbone may be naturally occurring and may be straight chained or branched. In preferred embodiments, the cellulosic backbone is triacetate cellulose or monoacetate cellulose. The cellulosic backbone may be obtained from commercial sources, but in preferred embodiments, a cellulosic backbone obtained from such sources is de-polymerized prior to preparation of the grafts or copolymers.

Cellulosic materials are preferably those obtained from the esterification of natural or regenerated cellulose. Cellulose esters such as cellulose mono-, di- and tri-acetate, or as cellulose mono-, di- and tri-propionate are preferred. Depolymerization is performed according to known procedures. For instance, one can start from microcrystalline cellulose, that is successively hydrolyzed in fuming HCl in cellulose oligomers, then isolated and re-acetylated in triacetate cellulose (Flugge L. A et al., *J. Am. Chem. Soc.* 1999, 121, 7228–7238). This process works well when very low molecular weights are targeted, for example for a degree of polymerization of about 8 and below. Other processes start from cellulose esters with a DS between 2.7 and 3 (e.g., fully esterified cellulose), which are contacted either with Bronsted acid, such as HBr (De Oliveira W. et al., *Cellulose*, 1994, 1, 77–86), or Lewis acid such as $BF_3$ (U.S. Pat. No. 3,386,932). Each of these references is incorporated herein by reference. Molecular weight control of the cellulosic backbone is achieved by adjusting the reaction conditions, like temperature, time of contact and concentration of the acid, etc.

Whether depolymerization is carried out or not, the cellulosic backbone has a number average molecular weight in the range of from about 3,000 to about 100,000, more preferably in the range of from about 3,000 to about 60,000 and most preferable in the range of from about 3,000 to about 20,000. Depending on the exact type of cellulose, the degree of polymerization can range from about 15 to about 250, more preferably from about 15 to about 100, and most preferably from about 15 to about 80.

Depending on the starting material (e.g., cellulose triacetate or cellulose monoacetate), the cellulosic backbone polymer optionally may be hydroylzed or saponified. Hydrolysis or saponification may optionally be performed on the graft or copolymers of this invention after the grafts or blocks have been grown from the cellulosic backbone. The purpose of this step in the process is to provide water solubility or dispersability to the cellulosic graft or copolymers of this invention. The term "water soluble" as used herein means that the graft or copolymers are either freely soluble in or dispersible (as a stable suspension) in at least water or a buffered water solution. "Soluble" herein means that the copolymer dissolves in the solvent or solvents at 25° C. at a concentration of at least about 0.1 mg/mL, preferably about 1 mg/mL, more preferably about 2 mg/mL, and most preferably about 10 mg/mL. Hydrolysis or saponification is carried out substantially according to methods known to those of skill in the art. Hydrolysis is carried out by reacting the cellulosic backbone with an acid, such as acetic acid. Generally, the deacetylation/hydrolysis is carried out in a mix of acetic acid, water and methanol at an appropriate temperature (e.g., about 155° C.) in an appropriate vessel (e.g., a sealed reactor). Typical reaction times are 9 to 12 hrs. The product is isolated by precipitation into acetone and yields a water soluble/dispersible form of cellulosic material (acetate DS~0.75–1.25). See, for example, WO 00/22224, which is incorporated herein by reference. Saponification, generally, is carried out by reacting the cellulosic backbone material with a base, such as NaOH or KOH. Typically, a solution of the cellulosic backbone material in a solvent (e.g., dimethylformamide (DMF) or tetrahydro furan (THF), for example in a concentration 10 to 25 weight %) is added into an aqueous solution of the base (for example, in a concentration 0.1M to 1M preferably between 0.1M to 0.5M, at temperatures between 25° C. and 80° C., preferably between 40° C. and 60° C. to make up a total polymer concentration of 10000 ppm).

The cellulosic backbone is substituted (sometimes referred to as "activated") with a desired degree of substitution of initiator-control agent adducts so that grafts or blocks may be polymerized or grown from the sites of attachment of the initiator-control agent adducts. Because polymerization will appear to have occurred between the bond of the initiator and control agent, with the initiator fragment or the control agent fragment may be attached to the cellulosic backbone, such that the substituted material may be characterized by the general formula:

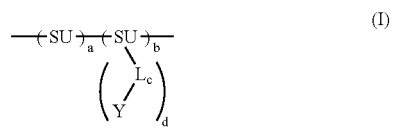

(I)

where SU represents a sugar unit in the cellulosic material, L is an optional linker, Y is the initiator control agent adduct or chain transfer agent (collectively generally referred to herein a "control agent"), a is the number of sugar units that do not have a Y substitution and is typically in the range of from about 3–80, b is the number sugar units that have at least one Y substitution and is typically in the range of from about 1–25, c is 0 or 1 depending on whether a linker is present, d is the degree of substitution of Y control agents on a single sugar unit and is in the range of from about 1–3. Formula I is not intended to indicate any particular order to the arrangement of the sugar units having a control agent substitution ($SU_b$) as compared to sugar units without a control agent substitution ($SU_a$). As discussed below, the overall DS of the control agents on the cellulosic backbone can vary. The sugar units may be placed in any order (e.g., random) and there may be many more unsubstituted sugar units ($SU_a$) than substituted sugar units ($SU_b$). Moreover, formula (I) shows the middle sugar units of the cellulosic backbone, but the copolymer embodiment of this invention has the Y substituents placed on at least one terminal end sugar unit.

In some preferred embodiments, a, b and d are numbers that will give the graft or copolymers of this invention the desired level of adherence to the surface or fiber. In other words, a, b and d control the properties of the resultant polymer. Since it is an object of this invention to provide a grafted or copolymers cellulosic material that adheres to cotton or other fibers or surfaces, then control of a, b and d may be critical to the invention.

As those of skill in the art will appreciate, a and b are typically determined from a bulk sample by nuclear magnetic resonance (NMR), gel permeation chromatography (GPC) or some other spectroscopic or chromatographic technique. Thus, a and b may be average numbers across the bulk sample and they may not be integers. Using formula (I), the number of grafts per chain is calculated by multiplying b times d. And, the graft density for a bulk sample (which is sometimes referred to herein as the degree of substitution of grafts or graft DS) is determined by the formula (b*d)/(a+b), where the average graft density for a bulk sample is determined by NMR or another spectroscopic technique and (a+b) is determined on average by GPC or another chromatographic technique. These two measurements will allow for calculation of the number of grafts per chain (b*d). In some embodiments, graft density for a bulk sample (i.e., the DS of graft chains in the bulk sample) is in the range of from about 0.005 to about 3, more preferably in the range of from about 0.01 to about 1 and even more preferably in the range of from about 0.05 to about 0.15. One specific method for experimentally determining the DS of the grafts is by proton NMR. In this approach, the integrated area under the peak is divided by the expected number of protons for both the control agent and the sugar units. These numbers are used to create a ratio of control agent to sugar unit, which is considered to be the degree of substitution of the control agents in the bulk sample. This is the methodology used in the examples, below.

The number of grafts per chain is preferably in the range of from about 1 to about 75 and more preferably in the range of from about 1 to 20. Although the discussion in this paragraph is presented in terms of "grafts", those of skill in the art will appreciate that this same discussion applies to the degree of substitution of control agents in the bulk sample (e.g., DS of control agents is determined on a bulk sample by the measurement techniques discussed herein and may be represented by the formula (b*d)/(a+b)). In addition to the NMR, GPC and other spectroscopic techniques discussed above, the number of Y attachment points may be determined by enzymatic digestion of the cellulosic backbone to glucose. This method is known to those of skill in the art and typically involves a GPC measurement for number average molecular weight with a calculation to obtain the number of chains.

In formula (I), Y is the initiator control agent adduct, iniferter or chain transfer agent, which is the portion that provides control of the free radical polymerization process, and is thus generally referred to herein as the control agent (CA). This portion of the molecule can include an initiating portion or not, depending on the method of polymerization being employed. One preferred embodiment is where Y is a control agent without an initiating fragment (i.e., -CA). When initiator fragment is present, Y may be either —I-CA or -CA-I, where CA refers to a control agent moiety or fragment and I refers to an initiator moiety or fragment. Therefore the number of grafts can be defined by the number of attachment points of a —I-CA or -CA group. When an initiating fragment is present in Y, the —I-CA embodiment is generally preferred.

Y is selected from those control agents that provide living-type kinetics to the polymerization of at least one monomer from the site of attachment of the agent. Typically, the agent must be able to be expelled as or support a free radical. In some embodiments, Y is characterized by the general formula:

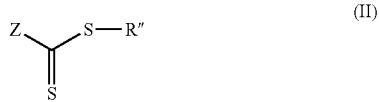

(II)

where Z is any group that activates the C=S double bond towards a reversible free radical addition fragmentation reaction and R" is selected from the group consisting of, generally, any group that can be easily expelled under its free radical form (R'•) upon an addition-fragmentation reaction. This control agent can be attached to the cellulosic backbone through either Z or R", however, for ease these groups are discussed below in terms as if they are not the linking group to the cellulosic backbone (thus, e.g., alkyl would actually be alkylene). R" is generally selected from the group consisting of optionally substituted hydrocarbyl, and heteroatom-containing hydrocarbyl. More specifically, R" is selected from the group consisting of optionally substituted alkyl, aryl, alkenyl, alkoxy, heterocyclyl, alkylthio, amino and polymer chains. And still more specifically, R" is selected from the group consisting of —CH$_2$Ph, —CH(CH$_3$)CO$_2$CH$_2$CH$_3$, —CH(CO$_2$CH$_2$CH$_3$)$_2$, —C(CH$_3$)$_2$CN, —CH(Ph)CN and —C(CH$_3$)$_2$Ph. Z is typically selected from the group consisting of hydrocarbyl, substituted hydrocarbyl, heteroatom-containing hydrocarbyl and substituted heteroatom containing hydrocarbyl. More specifically, Z is selected from the group consisting of optionally substituted alkyl, aryl, heteroaryl and most preferably is selected from the group consisting of amino and alkoxy. In other embodiments, Z is attached to C=S through a carbon atom (dithioesters), a nitrogen atom (dithiocarbamate), two nitrogen atoms in series (dithiocarbazate), a sulfur atom (trithiocarbonate) or an oxygen atom (dithiocarbonate). Specific examples for Z can be found in WO 98/01478, WO99/35177, WO99/31144, WO98/58974, U.S. Pat. No. 6,153,705, and U.S. patent application Ser. No. 09/676,267, filed Sep. 28, 2000, each of which is incorporated herein by reference. Particularly preferred control agents of the type in formula II are those where the control agent is attached through R" and Z is either, a carbazate, —OCH$_2$CH$_3$ or pyrrole attached via the nitrogen atom. As discussed below, linker molecules can be present to attach the C=S group to the cellulose backbone through Z or R".

In another embodiment, when the —I-CA embodiment is being used, the control agent may be a nitroxide radical. Broadly, the nitroxide radical control agent may be characterized by the general formula —O-NR$^5$R$^6$, wherein each of R$^5$ and R$^6$ is independently selected from the group of hydrocarbyl, substituted hydrocarbyl, heteroatom containing hydrocarbyl and substituted heteroatom containing hydrocarbyl; and optionally R$_5$ and R$^6$ are joined together in a ring structure. In a more specific embodiment, the control agent may be characterized by the general formula:

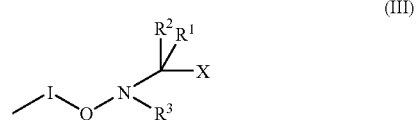

(III)

where I is a residue capable of initiating a free radical polymerization upon homolytic cleavage of the I—O bond, the I residue being selected from the group consisting of fragments derived from a free radical initiator, alkyl, substituted alkyl, alkoxy, substituted alkoxy, aryl, substituted aryl, and combinations thereof; X is a moiety that is capable of destabilizing the control agent on a polymerization time scale; and each R$^1$ and R$^2$, independently, is selected from the group consisting of alkyl, substituted alkyl, cycloalkyl, substituted cycloalkyl, heteroalkyl, heterocycloalkyl, substituted heterocycloalkyl, aryl, substituted aryl, heteroaryl, substituted heteroaryl, alkoxy, aryloxy, silyl, boryl, phosphino, amino, thio, seleno, and combinations thereof; and R$^3$ is selected from the group consisting of tertiary alkyl, substituted tertiary alkyl, aryl, substituted aryl, tertiary cycloalkyl, substituted tertiary cycloalkyl, tertiary heteroalkyl, tertiary heterocycloalkyl, substituted tertiary heterocycloalkyl, heteroaryl, substituted heteroaryl, alkoxy, aryloxy and silyl. Preferably, X is hydrogen. Synthesis of the types of initiator-control agents in formula III is disclosed in, for example, Hawker et al., "Development of a Universal Alkoxyamine for 'Living' Free Radical Polymerizations," *J. Am. Chem. Soc.*, 1999, 121(16), pp. 3904–3920 and U.S. patent application Ser. No. 09/520,583, filed March 8, 2000 and corresponding international application PCT/US00/06176, all of which are incorporated herein by reference.

Control Agent Attachment

In order to attach Y to the cellulosic backbone, a linker is typically employed (i.e., c=1), designated L in formula I. Linkers are at least dual functional molecules that will react with either a hydroxyl or acetyl ester group of the cellulosic backbone; the linker will also be able to react with a precursor molecule that comprises the Y unit. Typically, a linker has from 2 to 50 non-hydrogen atoms. Linkers (L) may be selected from any of the molecules discussed in this section. Given the molecular weights of the cellulosic backbone and the grafts or blocks that are being added to that backbone, the length of the linker molecule may be chosen to affect or not affect the properties of the graft or block copolymer. In order to reduce the possibility of affecting the properties of the final polymer, the size of the linker molecule may be reduced in some embodiments (e.g., lower molecular weight or steric bulk).

In some preferred embodiments of the invention, the control agent is a thiocarbonylthio derivative with the following structure Z-C(=S)—S, with the control agent is linked to the cellulosic material via the Z or S moiety, as discussed above in association with formula II. For graft copolymers, several techniques are available to attach the control agent to the sugar units within the chain backbone.

In a first embodiment, a di-isocyanate linker is used to attach the control agent to the cellulosic backbone. Generally, a bis-isocyanate is reacted with a cellulose ester (having a DS ranging from about 2.5 to 2.7) together with a catalyst, such as a catalytic amount of dibutyldilauryl tin. In some preferred embodiments, the linker is a di-isocyanate compound, having from 8–50 non-hydrogen atoms. Isocyanates are known to react with —OH, —SH and —NH$_2$ groups, thereby allowing for effective linking of the cellulosic backbone with a properly prepared control agent. Di-isocyanate linkers may be characterized by the general formula: O=C=N—R'—N=C=O, wherein R' is selected from the group consisting of optionally substituted alkyl and aryl. The pendant NCO groups of the bis-isocyanate are then reacted with an OH-functional control agent. Most preferred di-isocyanate linkers include isophrorone di-isocyanate (IPDI) and hexamethylene-disocyanate. Other useful di-isocyanate derivatives can be found in "Isocyanates Building Blocks for Organic Synthesis" Aldrich commercial leaflet (PO Box 355 Milkauwee, Wis. 53201 USA), which is incorporated herein by reference. An alternative process comprises forming the chloroformate derivative through phosgenation of the residual OH of the cellulose ester, and then reacting the latter with an hydroxyl (or any other NCO reactive) functional control agent.

The following scheme 1 shows an embodiment of this method:

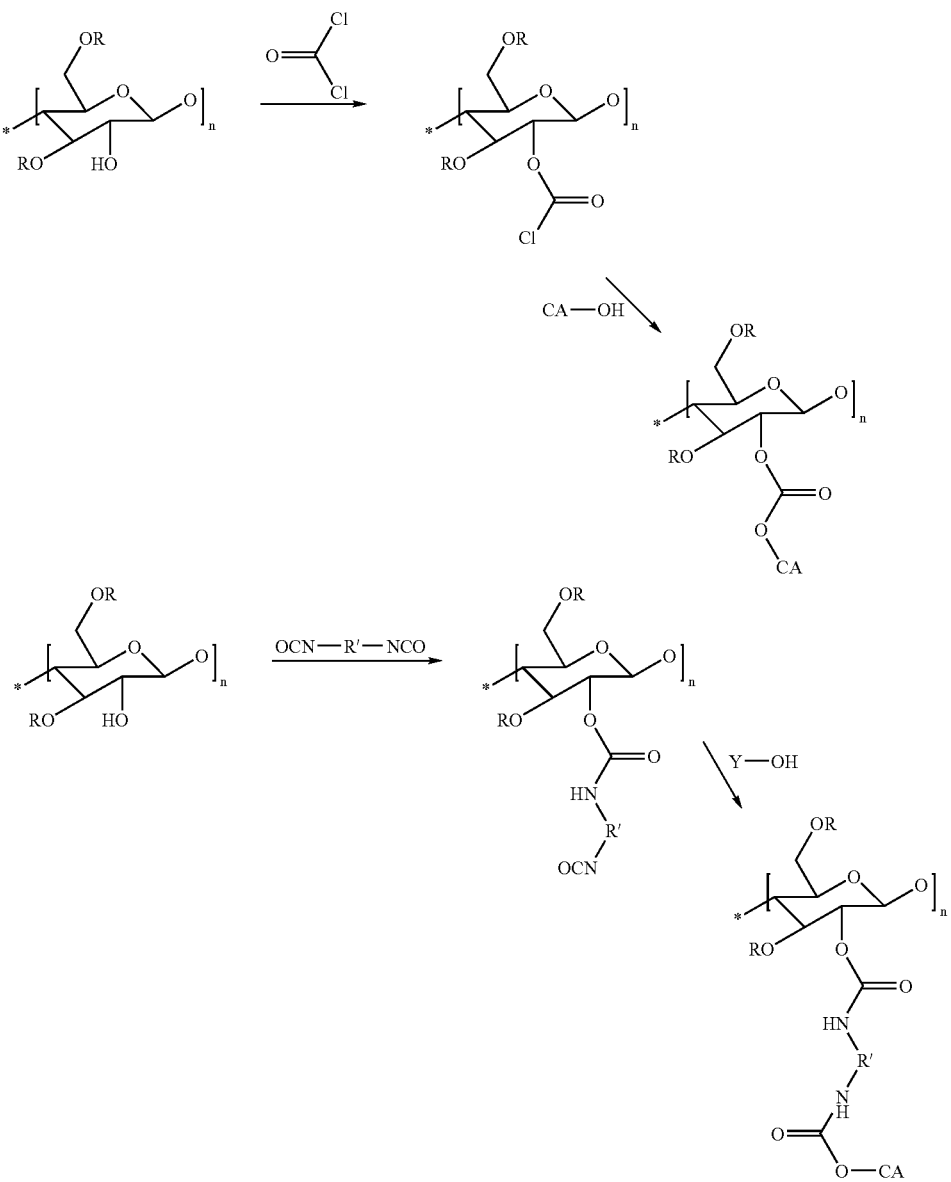

Scheme 1

In scheme 1, some embodiments will replace CA with Y, in order to show where the polymerization may appear to occur. When a saponification or hydrolysis step is involved as a final step in the process (see FIG. 2), then the linkage between the control agent and the cellulose ester backbone is chosen as to resist the saponification conditions. Particularly preferred are urethane or amide linkages that tend to be hydrolitically robust to saponification or hydrolysis conditions. Some examples of CA-OH functional control agents useful in scheme 1 (within formula II, for example) are:

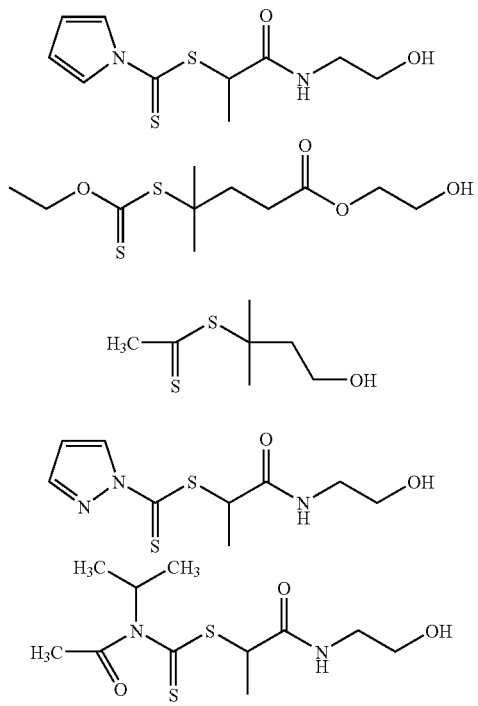

Another embodiment for a linker (L) is the direct attachment of thiocarbonyl-thio control agents to the sugar rings. Generally, in this process the residual OH groups on the cellulosic backbone are first activated by either chlorosulfonyl acids (e.g., tosylates, mesylates, or triflates) or acid chlorides (e.g., para-nitrophenyl chloroformate). Thereafter, the cellulosic material is treated with the metal salt of the corresponding thiocarbonyl-thio compound (e.g., dithiocarbonate, dithiocarbamate) to graft the desired control agents to the cellulosic backbone. This is shown for example in the following scheme 2.

Scheme 2

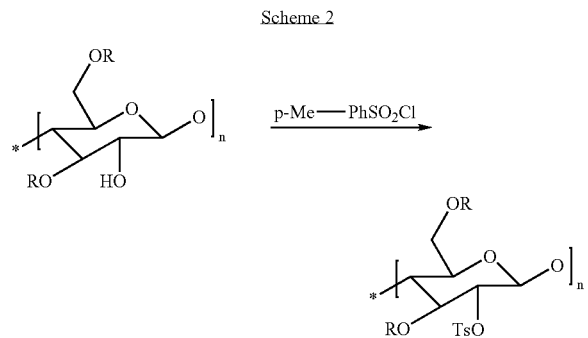

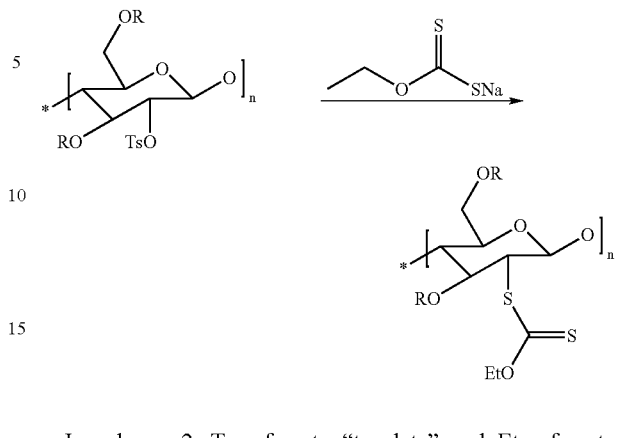

In scheme 2, Ts refers to "tosylate" and Et refers to "ethyl".

In other preferred embodiments, block copolymers are prepared, with one of the blocks being the cellulosic material. Anchoring of the control agent to at least one terminal end portion of the cellulosic material is achieved selectively at the C-1 anomeric carbon of the terminal sugar unit by either reductive amination or halogenation.

In the reductive amination route, the reducing terminal glucose residue is converted to an amino group by reacting the cellulosic materials with an excess of the amine or hydroxyamine together with either sodium borohydride or sodium cyanoborohydride. Reduction under high pressure of hydrogen with a Nickel Raney catalyst can also be utilized. Details of these procedures can be found in Danielson S. et al., *Glycoconjugate Journal* (1986) 3:363–377; Larm O. et al., *Carbohydrate Research*, 58(1977) 249–251; WO 98/15566; and EP 0725 082, each of which is incorporated herein by reference. The following scheme 3 presents an example of this pathway:

Scheme 3

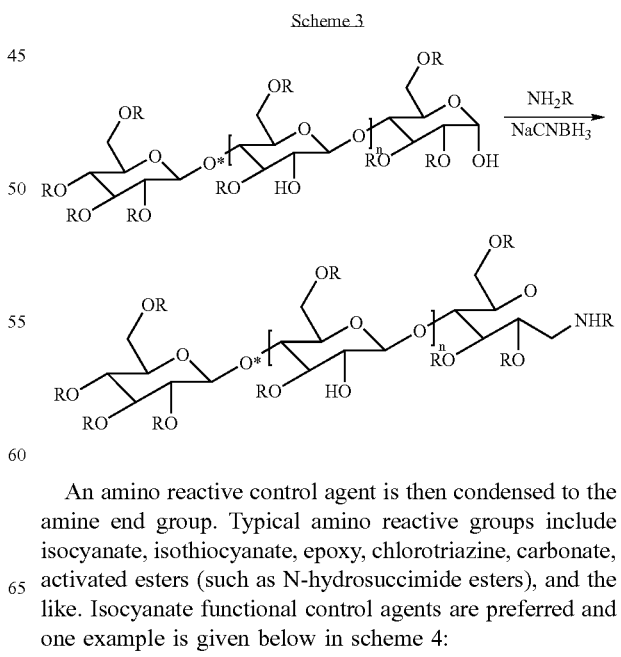

An amino reactive control agent is then condensed to the amine end group. Typical amino reactive groups include isocyanate, isothiocyanate, epoxy, chlorotriazine, carbonate, activated esters (such as N-hydrosuccimide esters), and the like. Isocyanate functional control agents are preferred and one example is given below in scheme 4:

Scheme 4

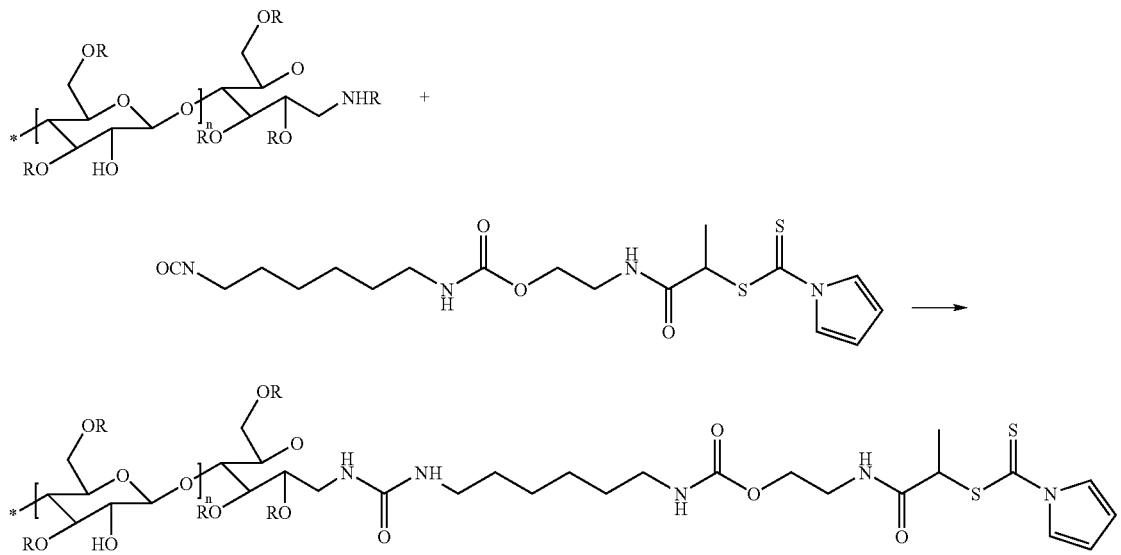

Scheme 4 shows a pyrrole as Z (from formula II), however those of skill in the art will appreciate that other moieties can be used in this location of the control agent, as discussed above (e.g., the CA-OH listed compounds listed above).

In the halogenation route to attach the control agents to the terminal end portions of the cellulosic backbone, cellulose esters are depolymerized in a mixture of HBr and acetic anhydride in methylene chloride as described by De Oliveira W. et al., *Cellulose,* 1994, 1, 77–86, which is incorporated herein by reference. The terminal glycosyl bromide is then displaced by the thiocarbonyl-thio salt of the corresponding control agent, as exemplified in the following scheme 5:

Scheme 5

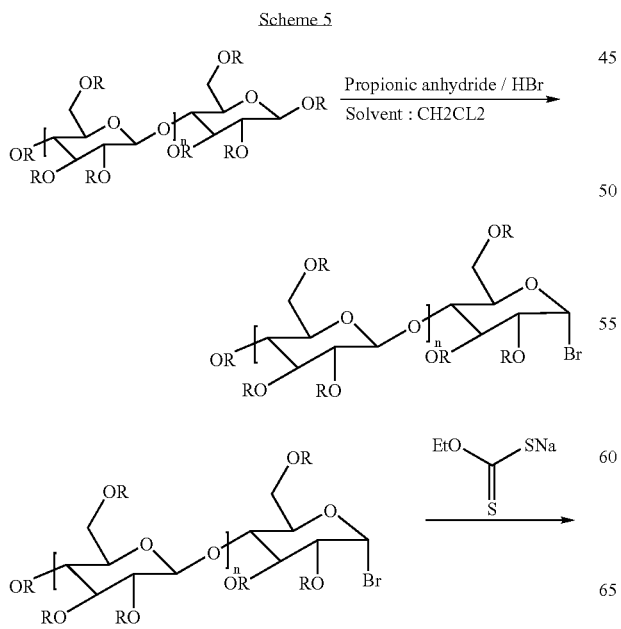

-continued

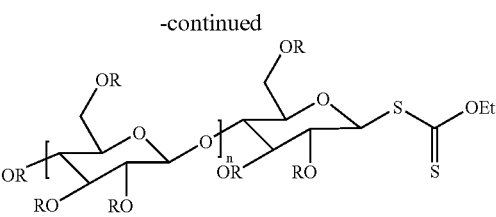

Scheme 5 shows ethoxy as Z (from formula II), however those of skill in the art will appreciate that other moieties can be used in this location of the control agent, as discussed above. This process typically employs a cellulose triacetate (e.g., a fully esterified cellulosic material) otherwise side-reactions may occur during the control agent attachment step, which may lead to branched polymers. A variant of this process comprises hydrolyzing the bromide into OH; the OH-terminated cellulose ester is then coupled with an OH reactive control agent such as described above.

In each of schemes 1–5, the following formula is employed:

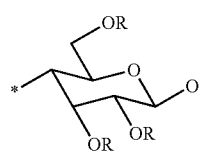

wherein R is selected from the group consisting of hydrogen or acetate and * refers to either an end or additional sugar units. Also schemes that use the "n" designation are referring to the degree of polymerization, discussed herein.

Generally, the polymerization of the graft segments or blocks proceeds under polymerization conditions. Polymerization conditions include the ratios of starting materials, temperature, pressure, atmosphere and reaction time. The atmosphere may be controlled, with an inert atmosphere being preferred, such as nitrogen or argon. The molecular weight of the polymer can be controlled via controlled free radical polymerization techniques or by controlling the ratio of monomer to initiator. The reaction media for these polymerization reactions is either an organic solvent or bulk monomer or neat. Polymerization reaction time may be in the range of from about 0.5 hours to about 72 hours, preferably from about 1 hour to about 24 hours and more preferably from about 2 hours to about 12 hours.

When the control agent is of formula II, the polymerization conditions that may be used include temperatures for polymerization typically in the range of from about 20° C. to about 110° C., more preferably in the range of from about 50° C. to about 90° C. and even more preferably in the range of from about 70° C. to about 85° C. The atmosphere may be controlled, with an inert atmosphere being preferred, such as nitrogen or argon. The molecular weight of the polymer is controlled via adjusting the ratio of monomer to control agent. Generally, the ratio of monomer to control agent is in the range of from about 200 to about 800. A free radical initiator is usually added to the reaction mixture, so as to maintain the polymerization rate to an acceptable level. Conversely, a too high free radical initiator to control agent ratio will favor unwanted dead polymer formation, namely pure homopolymers or block copolymers of unknown composition. The molar ratio of free radical initiator to control agent for polymerization are typically in the range of from about 2:1 to about 0.02:1.

When the control agent is of a nitroxide radical type (see formula III), polymerization conditions include temperatures for polymerization typically in the range of from about 80° C. to about 130° C., more preferably in the range of from about 95° C. to about 130° C. and even more preferably in the range of from about 120° C. to about 130° C. Generally, the ratio of monomer to initiator is in the range of from about 200 to about 800.

Initiators used in the polymerization process with a control agent (and from which I may be derived) may be known in the art. Such initiators may be selected from the group consisting of alkyl peroxides, substituted alkyl peroxides, aryl peroxides, substituted aryl peroxides, acyl peroxides, alkyl hydroperoxides, substituted alkyl hydroperoxides, aryl hydroperoxides, substituted aryl hydroperoxides, heteroalkyl peroxides, substituted heteroalkyl peroxides, heteroalkyl hydroperoxides, substituted heteroalkyl hydroperoxides, heteroaryl peroxides, substituted heteroaryl peroxides, heteroaryl hydroperoxides, substituted heteroaryl hydroperoxides, alkyl peresters, substituted alkyl peresters, aryl peresters, substituted aryl peresters, and azo compounds. Specific initiators include BPO and AIBN. In some embodiments, as discussed above, the I fragment or residue may be selected from the group consisting of fragments derived from a free radical initiator, alkyl, substituted alkyl, alkoxy, substituted alkoxy, aryl, substituted aryl, and combinations thereof. Different I fragments may be preferred depending on the embodiment of this invention being practiced. For example, when the di-thio control agents as generally described in formula II are employed for Y equal to —I-CA, the I fragment may be considered to be a portion of the linker, for example, may be considered to be —CH($COOR^{10}$)— where $R^{10}$ is selected from the group consisting of hydrocarbyl and substituted hydrocarbyl, and more specifically alkyl and substituted alkyl. Initiation may also be by heat or radiation, as is generally known in the art.

Ideally, the growth of grafts or blocks attached to the cellulosic backbone occurs with high conversion. Conversions are determined by NMR via integration of polymer to monomer signals. Conversions may also be determined by size exclusion chromatography (SEC) via integration of polymer to monomer peak. For UV detection, the polymer response factor must be determined for each polymer/monomer polymerization mixture. Typical conversions can be 50% to 100%, more specifically in the range of from about 60% to about 90%.

Optionally, the dithio moiety of the control agent of those in formula II can be cleaved by chemical or thermal ways, if one wants to reduce the sulfur content of the polymer and prevent any problems associated with presence of the control agents chain ends, such as odor or discoloration. Typical chemical treatment includes the catalytic or stochiometric addition of base such as a primary amine, acid or anhydride, or oxydizing agents such as hypochloride salts.

As used herein, "block copolymer" refers to a polymer comprising at least two segments having at least two differing compositions, where the monomers are not incorporated into the polymer architecture in a solely statistical or uncontrolled manner. In this invention, at least one of the blocks is a cellulosic block. Although there may be two, three, four or more monomers in a single block-type polymer architecture, it will still be referred to herein as a block copolymer. The block copolymers of this invention may include one or more blocks of random copolymer (sometimes referred to herein as an "R" block) together with one or more blocks of single monomers, so long as there is a cellulosic backbone from which the blocks are centrally tied. Moreover, the random block can vary in composition or size with respect to the overall block copolymer. In some embodiments, for example, the random block will account for between 5 and 80% by weight of the mass of the block copolymer. In other embodiments, the random block R will account for more or less of the mass of the block copolymer, depending on the application. Furthermore, the random block may have a compositional gradient of one monomer to the other (e.g., A:B) that varies across the random block in an algorithmic fashion, with such algorithm being either linear having a desired slope, exponential having a desired exponent (such as a number from 0.1–5) or logarithmic. The random block may be subject to the same kinetic effects, such as composition drift, that would be present in any other radical copolymerization and its composition, and size may be affected by such kinetics, such as Markov kinetics.

A "block" within the scope of the block copolymers of this invention typically comprises about 5 or more monomers of a single type (with the random blocks being defined by composition and/or weight percent, as described above). In preferred embodiments, the number of monomers within a single block may be about 10 or more, about 15 or more, about 20 or more or about 50 or more. The existence of a block copolymer according to this invention is determined by methods known to those of skill in the art. For example, those of skill in the art may consider nuclear magnetic resonance (NMR) studies, measured increase of molecular weight upon addition of a second monomer to chain-extend a first block, observation of microphase separation, including long range order (determined by X-ray diffraction), microscopy and/or birefringence measurements. Other methods of determining the presence of a block copolymer include mechanical property measurements, (e.g., elasticity of hard/soft/hard block copolymers), thermal analysis and gradient elution chromatography (e.g., absence of homopolymer).

The grafts or additional block(s) attached to the cellulosic backbone typically has a number average molecular weight of from 100 to 10,000,000 Da (preferably from 2,000 to 200,000 Da, more preferably from 10,000 to 100,000 Da) and a weight average molecular weight of from 150 to 20,000,000 Da (preferably from 5,000 to 450,000 Da, more preferably from 20,000 to 400,000 Da).

The monomers chosen for the grafts or blocks are typically selected in a manner so as to produce the desired affect on the surface or fiber. For example, the monomers may be chosen for their particular hydrophilic or hydrophobic characteristics.

Hydrophilic monomers include, but are not limited to, acrylic acid, methacrylic acid, N,N-dimethylacrylamide, dimethyl aminoethyl methacrylate, quaternized dimethylaminoethyl methacrylate, methacrylamide, N-t-butyl acrylamide, maleic acid, maleic anhydride and its half esters, crotonic acid, itaconic acid, acrylamide, acrylate alcohols, hydroxyethyl methacrylate, diallyldimethyl ammonium chloride, vinyl ethers (such as methyl vinyl ether), maleimides, vinyl pyridine, vinyl imidazole, other polar vinyl heterocyclics, styrene sulfonate, allyl alcohol, vinyl alcohol (such as that produced by the hydrolysis of vinyl acetate after polymerization), salts of any acids and amines listed above, and mixtures thereof. Preferred hydrophilic monomers include acrylic acid, N,N-dimethyl acrylamide, dimethylaminoethyl methacrylate, quaternized dimethyl aminoethyl methacrylate, vinyl pyrrolidone, salts of acids and amines listed above, and combinations thereof.

Hydrophobic monomers may be listed above and include, but are not limited to, acrylic or methacrylic acid esters of $C_1$–$C_{18}$ alcohols, such as methanol, ethanol, methoxy ethanol, 1-propanol, 2-propanol, 1-butanol, 2-methyl-1-propanol, 1-pentanol, 2-pentanol, 3-pentanol, 2-methyl-1-butanol, 1-methyl-1-butanol, 3-methyl-1-butanol, 1-methyl-1-pentanol, 2-methyl-1-pentanol, 3-methyl-1-pentanol, t-butanol (2-methyl-2-propanol), cyclohexanol, neodecanol, 2-ethyl-1-butanol, 3-heptanol, benzyl alcohol, 2-octanol, 6-methyl-1-heptanol, 2-ethyl-1-hexanol, 3,5-dimethyl-1-hexanol, 3,5,5-tri methyl-1-hexanol, 1-decanol, 1-dodecanol, 1-hexadecanol, 1-octa decanol, and the like, the alcohols having from about 1 to about 18 carbon atoms, preferably from about 1 to about 12 carbon atoms; styrene; polystyrene macromer, vinyl acetate; vinyl chloride; vinylidene chloride; vinyl propionate; alpha-methylstyrene; t-butylstyrene; butadiene; cyclohexadiene; ethylene; propylene; vinyl toluene; and mixtures thereof. Preferred hydrophobic monomers include n-butyl methacrylate, isobutyl methacrylate, t-butyl acrylate, t-butyl methacrylate, 2-ethylhexyl methacrylate, methyl methacrylate, vinyl acetate, vinyl acetamide, vinyl formamide, and mixtures thereof, more preferably t-butyl acrylate, t-butyl methacrylate, or combinations thereof.

Polymers

The cellulosic graft or copolymers of this invention may have properties that can be tuned or controlled depending on the desired use of the polymer. Thus, for example, when the water solubility of the chosen graft material is low or poor and the cellulosic backbone is more water soluble than the grafts (e.g., is cellulose mono-acetate), then the polymer may form micelle like structures, with the hydrophobic materials being attracted to each other and the more hydrophilic materials forming an outer ring.

Following the above procedures yields a polymer either having a cellulosic backbone with grafts of controlled structure and composition or a block copolymer or a combination of both. In some embodiments the polymers obtained are novel, which may be characterized by the size of the cellulosic backbone, the number of graft chains extending from that backbone and the length of the graft chains. In addition, these grafts are preferably single point attached to the backbone, and in some embodiments preferably, water-soluble. Where control of the polymerization is partially list, then some of the grafts may be connected to several backbone chains leading to cross-linking. Water solubility is defined above. Cross-linking may be determined for the polymers of this application by light scattering or more specifically dynamic light scattering (DLS). Alternatively, filtration of the polymer sample through an about 0.2 to 0.5 micron filter without inducing a backpressure would, for purposes of this application, indicate a lack of cross linking in the polymer sample. Also alternatively, other mechanical methods of determining cross-linking may be use, which are known to those of skill in the art. If a polymer passes any of these tests, it is considered substantially free of cross-linking for the purposes of this application, with "substantially" meaning less than or equal to about 20% cross-linked.

Using the above-described parameters, the novel polymers of this application are cellulosic backboned graft polymers have a degree of substitution (DS) of grafts in the bulk sample in the range of from 0.02 to about 0.15. As discussed above, the DS of graft chains in the bulk sample is dependant on two factors, the length of the cellulosic backbone and number of grafts. Generally, to fit the preferred DS, the cellulosic backbone typically has a molecular weight in the range of from about 10,000 to about 40,000 and the number of grafts can range from about 3 to 12. The general calculation to determine these numbers is that the molecular weight (e.g., either number average or weight average) of the cellulosic backbone is divided by the molecular weight of each sugar unit. This yields the number of sugar units, which is then multiplied by the degree of substitution in the bulk sample to yield number of grafts per cellulosic backbone. In formula form, this is {(Mw backbone/Mw sugar unit)×DS}=number of grafts. The grafts on the cellulosic backbone have a length (i.e., degree of polymerization) of between 25 and 200 monomer units and more preferably between 50 and 100 monomer units.

The cellulosic backbone is most preferably cellulose monoacetate, but the other cellulosic backbones are not excluded. The grafts can be selected from any of the above-listed monomers and depend on the end use of the polymer. As shown in the examples, the polymers that have this structure tend to have properties that allow for improved adsorption to surfaces and fibers.

EXAMPLES

General: In the examples of this invention, syntheses in inert atmospheres were carried out under a nitrogen or argon atmosphere. Other chemicals were purchased from commercial sources and used as received, except for monomers, which were filtered through a short column of basic aluminum oxide to remove the inhibitor and degassed by applying vacuum. Size Exclusion Chromatography was performed using automated rapid GPC system. In the current setup N,N-dimethylformamide containing 0.1% of trifluoroacetic acid was used as an eluent and polystyrene-based columns. All of the molecular weight results obtained are relative to linear polystyrene standards. $H^1$ NMR was carried out using a Bruker spectrometer (300 MHz) with $CDCl_3$ (chloroform-d) as solvent.

Example 1

Preparation of Grafted Polymers

Parts A–C of this example proceeds substantially according to the following scheme 6:

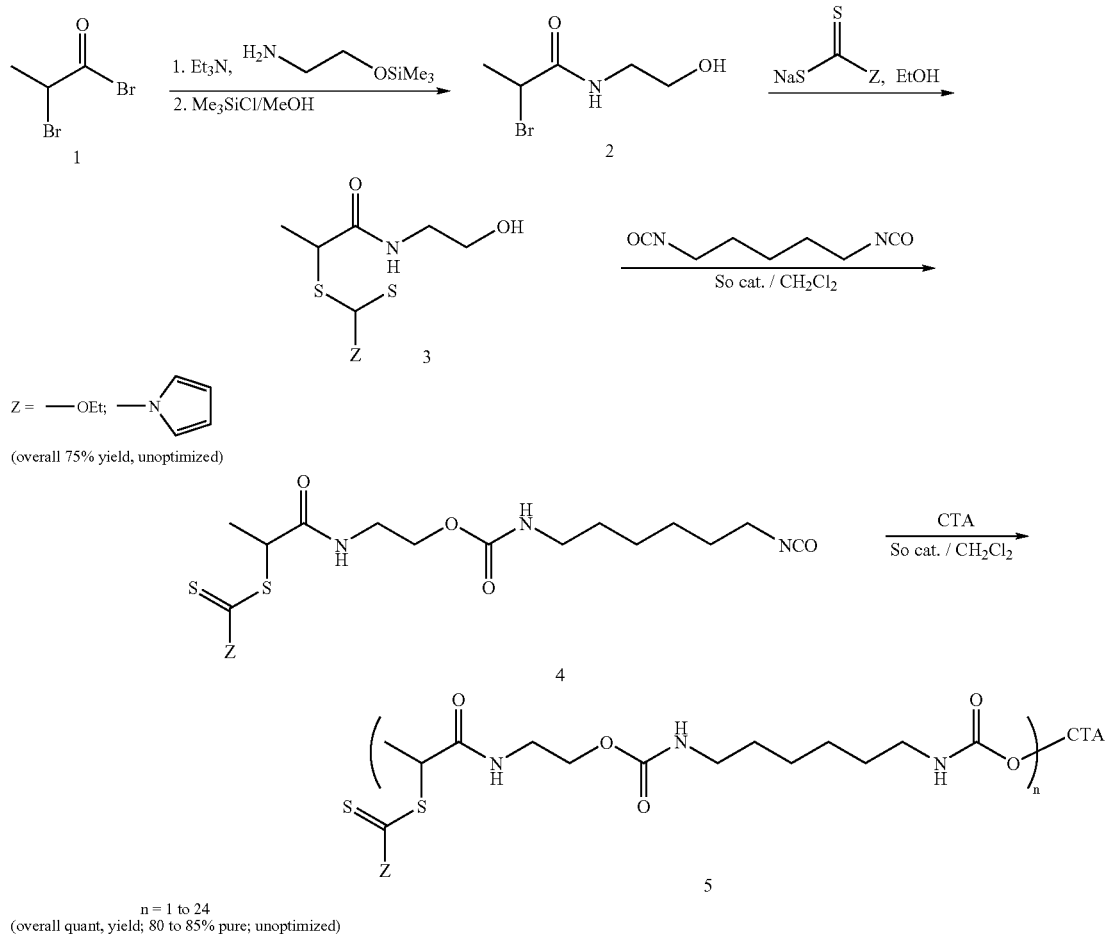

Scheme 6

Z = —OEt; —N(pyrrolyl)

(overall 75% yield, unoptimized)

n = 1 to 24
(overall quant. yield; 80 to 85% pure; unoptimized)

Part A: Synthesis of the Control Agent:

2-Bromopropionyl bromide 1 reacted with N-silyl protected ethanolamine to form the corresponding amide. Subsequently deprotection of silyl group occurred in acidic medium during the workup to give the N-hydroxyethyl 2-bromoacrylamide 2 in a quantitative yield. With no further purification, compound 2 was coupled with sodium dithiocarbamate to yield a yellow solid ("Control agent") compound 3 in 75% yield. All compounds were characterized by $^1$H NMR.

Part B: Depolymerization of the Cellulosic Backbone 50 g of cellulose triacetate ("CTA") (purchased from Aldrich, with a degree of substitution of about 2.7) was dissolved in 1000 ml of dichloroethane (purchased from Aldrich and used without any further purification) under inert atmosphere and heated to 70° C. with vigorous stirring. To this solution 0.5 ml of $BF_3.Et2O$ was added as a solution in 5 ml of dichloromethane. The mixture was stirred at 70° C. and the reaction was monitored by gel permeation chromatography (GPC). When the desired molecular weight was achieved (about 20,000 number average molecular weight ($M_n$)), the reaction was quenched with triethyl amine and allowed to cool to room temperature. The product was isolated by precipitation into ethyl ether or methanol or acetone or ethyl acetate. The product was purified by dissolution in THF and re-precipitation from ethyl ether. The product is characterized by $H^1$ NMR and GPC.

Part C: Attachment of Control Agent to Cellulosic Backbone

Attachment of control agent one end of the linker: 15 g of the control agent (from part A, above) was suspended in 150 ml of dry dichloromethane under an inert atmosphere. 50 ml of the dichloromethane was distilled off and the mixture was cooled to room temperature. 21 ml of hexane diisocyanate was added to the reaction followed by 200 μl of dibutyltin dilaurate. The reaction was stirred at room temperature for 15 min. The reaction mixture was then transferred into 1000 ml of dry hexane using a cannula. This mixture was stirred for 10 min and filtered. The residue was dissolved in dichloromethane and re-precipitated. The residue was isolated by filtration and dried under vaccum. This produces a control agent attached to one end of the linker, referred to as "control agent-linker."

20 g of depolymerized cellulose triacetate (M. 20,000 from part B, above) was supended in 100 ml of benzene. The mixture was then distilled to dryness under atmospheric pressure to azeotropically remove water from the cellulose triacetate. 100 ml of dry Dichloromethane was added to the vessel and 50 ml was removed by distillation. 2.5 g of the control agent-linker from the previous paragraph was added to the reaction followed by 200 μl of dibutyl dilaurate. The mixture was then stirred at 40° C. for 12 hrs. After this, the reaction mixture was cooled to room temperature, diluted to 150 ml with dichloromethane and precipitated by pouring into methanol. The residue was isolated by filtration and purified by re-precipitation from THF into methanol. The product was characterized by $H^1$ NMR and GPC.

Part D: Controlled Polymerization of Vinyl Monomers onto the Cellulosic Backbone:

Polymerization is carried out in a glove box with an inert atmosphere. The control agent modified cellulosic backbone (from part C) is dissolved in degassed dimethylformamide (DMF). To this, the desired vinyl monomer or monomers are added followed by azo-bis-isobutyronitrile (AIBN). The vial is then sealed and the contents stirred at about 60° C. for about 18 hrs.

The following Table 1 describes the synthesis of 20 polymers of dimethlacrylamide and/or acrylic acid grafted onto a cellulosic backbone ($M_n$ about 20,000) modified with xanthate control agent (with Z=—OEt (see Scheme 6, above) and with about 5.7 control agents per chain, as measured by NMR). Assuming a number average molecular weight of about 20,000, these polymers have a degree of substitution (DS) of about 0.057. The length of the grafts is controlled by the weight ratio of monomer to cellulosic backbone. The reactants are listed in milligrams and the reactions were carried out in 1 ml vials in accord with the above-described procedure.

TABLE 1

| | Cta-20K-hdi-5.7-A | Acrylic acid | Dimethyl acrylamide | AIBN | DMF |
|---|---|---|---|---|---|
| 1 | 50 | 1.25 | 23.75 | 0.117 | 174.8805 |
| 2 | 50 | 6.25 | 18.75 | 0.117 | 174.8805 |
| 3 | 50 | 12.5 | 12.5 | 0.117 | 174.8805 |
| 4 | 50 | 18.75 | 6.25 | 0.117 | 174.8805 |
| 5 | 50 | 23.75 | 1.25 | 0.117 | 174.8805 |
| 6 | 50 | 2.5 | 47.5 | 0.117 | 233.213 |
| 7 | 50 | 12.5 | 37.5 | 0.117 | 233.213 |
| 8 | 50 | 25 | 25 | 0.117 | 233.213 |
| 9 | 50 | 37.5 | 12.5 | 0.117 | 233.213 |
| 10 | 50 | 47.5 | 2.5 | 0.117 | 233.213 |
| 11 | 25 | 2.5 | 47.5 | 0.0585 | 174.939 |
| 12 | 25 | 12.5 | 37.5 | 0.0585 | 174.939 |
| 13 | 25 | 25 | 25 | 0.0585 | 174.939 |
| 14 | 25 | 37.5 | 12.5 | 0.0585 | 174.939 |
| 15 | 25 | 47.5 | 2.5 | 0.0585 | 174.939 |
| 16 | 25 | 5 | 95 | 0.0585 | 291.604 |
| 17 | 25 | 25 | 75 | 0.0585 | 291.604 |
| 18 | 25 | 50 | 50 | 0.0585 | 291.604 |
| 19 | 25 | 75 | 25 | 0.0585 | 291.604 |
| 20 | 25 | 95 | 5 | 0.0585 | 291.604 |

At the end of the reaction, polymers were obtained in each case and the mixtures were diluted to a concentration of about 16.6% polymer in DMF.

Part E: Saponification:

Saponification of the cellulosic backbone is carried out by starting with a about 16.6% of polymer in DMF added into 0.25M NaOH and stirred at 50° C. This was stirred for 30 minutes and thereafter cooled to room temperature.

Example 2

Demonstration of Adsorption to Cotton and Effect of Architecture on the Adsorbed Amount Eight samples of polydimethylacrylamide grafted on cellulose monoacetate (CMA) were prepared substantially according to the methods of Example 1. In this example, the control agent was one where "Z" was pyrrole (see scheme 6, above). The number of grafts and length were varied. A small amount of a fluorescent monomer, having the structure:

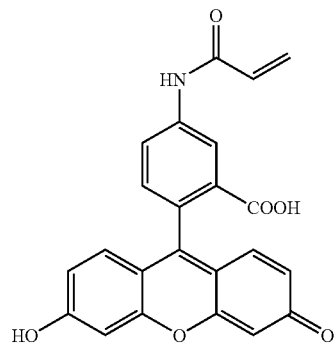

was incorporated in the grafts during polymerization of the dimethylacrylamide monomer. The following conditions were employed:

Molecular weight of CMA (Mn)~20,000 (rough approximation)

DS of control agent 0.075 and 0.15 onto the CMA

CMA:Monomer weight ratio varies from 1:2 to 1:16

Amount of fluorescent monomer: 0.75 mg in each sample

Total amount of polymer: 150.75 mg

Total solids concentration: 33.33%

Amount of AIBN: 10 mole % compared to control agent.

Reaction temperature: 60° C.

Reaction time: 18 hrs

Table 2 shows the amounts used in the polymerization mixtures: The grafts on the eight samples where polymerized in the following ratios, where "CMA-DS-0.075" represents cellulose monoacteate with a degree of substitution of 0.075 control agent in the cellulosic backbone (a graft density of 6 grafts per cellulosic backbone was measured by NMR) and "CMA-DS-0.15" represents cellulose monoacteate with a degree of substitution of 0.15 control agent in the cellulosic backbone (a graft density of 12 grafts per cellulosic backbone was measured by NMR):

TABLE 2

| | CMA-DS-0.15 (mg) | CMA-DS-0.075 (mg) | DMF (mg) | Dimethyl acrylamide (mg) |
|---|---|---|---|---|
| 1 | — | 50 | 350 | 100 |
| 2 | — | 30 | 350 | 120 |
| 3 | — | 16.67 | 350 | 133.33 |
| 4 | — | 8.82 | 350 | 141.18 |
| 5 | 50 | — | 350 | 100 |
| 6 | 30 | — | 350 | 120 |
| 7 | 16.67 | — | 350 | 133.33 |
| 8 | 8.82 | — | 350 | 141.18 |

Each polymerization resulted in a cellulose monoacetate graft polydimethylacrylamide polymer. The amount of dimethylacrylamide in the polymerization mixture determined the graft length.

The polymers were diluted in two steps to achieve a concentration of 200 ppm by weight in a buffered surfactant solution. The composition of the surfactant solution is as follows, with the solvent being demineralized water:

0.6 g/L LAS anionic surfactant (made from the reaction of dodecylbenzene sulphonic acid (e.g., Petrelab 550 available from Pretresa) and sodium hydroxide (e.g., available from Aldrich) resulting in a ca. 50 wt. % (in water) solution of the sodium salt of the acid, which is referred to as "LAS").
0.4 g/L $R(EO)_7$ (
1.25 g/L $Na_2CO_3$—JT Baker #3604-01
0.66 g/L STP (sodium triphosphate, available from Aldrich).
0.6 g/L NaCl
0.0882 g/L $CaCl_2 2H_2O$—Sigma #C-8106
pH=10.5.

The polymers were prepared at a nominal concentration of 30 wt % solids in DMF, and were used without any subsequent purification to remove solvent, unreacted monomer, etc. In the first dilution step, 66 μl of each crude reaction mixture was added to 2 ml of the surfactant solution, in a 2 ml capacity 96-well polypropylene microtiter plate. This gave an initial dilution of 1:30, or a polymer concentration of 1% w/v. The solutions were mixed by repeated aspiration and dispensing from a pipette into the well of the microtiter plate. In the second dilution step, 40 μl of the 1% w/v solutions were added to 2 ml of the surfactant solution in a second microtiter plate and mixed, giving an additional factor of 50 dilution and a final concentration of 0.02% w/v or 200 ppm w/v.

The polymers were tested for adsorption to cotton fabric using an apparatus for simultaneously contacting different liquids with different regions of a single sheet of fabric. This apparatus μs described in detail in U.S. patent application Ser. No. 09/593,730, filed Jun. 13, 2000, which is incorporated herein by reference. Briefly, six sheets of fabric were clamped between an upper and lower block. The fabric sheets had previously been printed with rubbery, cross-linked ink in microtiter plate pattern using standard screen printing techniques and materials. Both blocks contain 8×12 arrays of square cavities, which are aligned with un-printed regions of the fabrics. When the blocks and fabrics are clamped together, liquids placed in the individual wells do not leak or bleed through to other wells, due to the pressure applied by the blocks in the regions separating the wells, and due to the presence of the cross linked ink in these regions, which fills the pores between the fibers. The liquids are forced to flow back and forth through the fabric by means of a pneumatically actuated thin rubber membrane, which is placed between the fabrics and the lower block. Repeated flexing of the membrane away from and towards the fabrics results in fluid motion through the fabrics.

Six white cotton fabrics were tested simultaneously in a single apparatus. 400 μl of the 200 ppm polymer/surfactant solutions were placed in the corresponding wells in the apparatus. The liquids were flowed through the fabrics for 1 hour at room temperature, with a flow cycle time of approximately 0.5 seconds per complete cycle. After one hour, the free liquid in the cells was poured off, and the apparatus was immersed briefly in tap water to further remove free polymer solution. The blocks were then separated, and the fabrics were removed, separated, and thoroughly rinsed in 6 liters of tap water. The fabrics were allowed to air dry for 24 hours.

The amount of adsorbed polymer was determined by fluorescence imaging. Fluorescence imaging was performed by mounting the sample on a stage in a light-tight enclosure. Near-UV excitation (~365 nm) was provided by a pair of 8 watt UV fluorescent lamps mounted above and to the side of the sample on adjustable mounts. The total irradiance incident upon the sample was ~1.8 $mW/cm^2$ as measured with a calibrated radiometer (Minolta UM-1 w/UM-36 detector). Rejection of undesired reflected light was performed with a glass bandpass filter (Oriel part #59850) having a center wavelength of 520 nm, maximum transmission of 52%, and FWHM bandwidth of ~90 nm, mounted directly in front of the imaging lens. The photoluminescence of the samples was collected with a imaging grade lens of 60 mm focal length (Micro Nikkor) and imaged on a thermoelectrically cooled, 1152×1242 pixel, front illuminated, research grade focal plane array CCD detector (available from Princeton Instruments) under computer control. The exposure time was 20 seconds.

The images were analyzed on a computer using a program which allows the user to define a centroid position for the top left and bottom right library element; centroids for the remaining elements are then automatically generated using a simple gridding algorithm. The user also manually defines the size of a rectangular area around each centroid which is to be included in the analysis. Both the total number of counts within the sampled area and the average counts per pixel are calculated and stored, for each element in the grid. The latter number is used for comparisons between libraries, since the sampling area is set manually for each image and is not constant from one library to the next.

To calibrate the relationship between the amount of adsorbed polymer and the fluorescence signal, known amounts of the polymers were deposited on a second piece of fabric. This was done by first preparing a series of solutions at known polymer concentrations, beginning with a 1% wt concentration and diluting progressively by factors of two for a total of eight concentrations. This was done for all eight poly(DMA-graft-CMA) polymers being tested, for a total of 64 test solutions, 1 ml of each contained in an 8×8 array of cells in a 2 ml microfiter plate. For each solution, 5 ul was pipetted directly onto the corresponding square of the second fabric, and allowed to dry. The total amount of polymer deposited can be calculated from the product of the solution concentration times the volume deposited (table 2, below). The average mass of fabric in each square is 7.5 mg. The calibration sample with deposited polymers was imaged in the fluorescence system described above under identical conditions to the "test" fabrics containing the adsorbed graft polymers.

Figure 3:
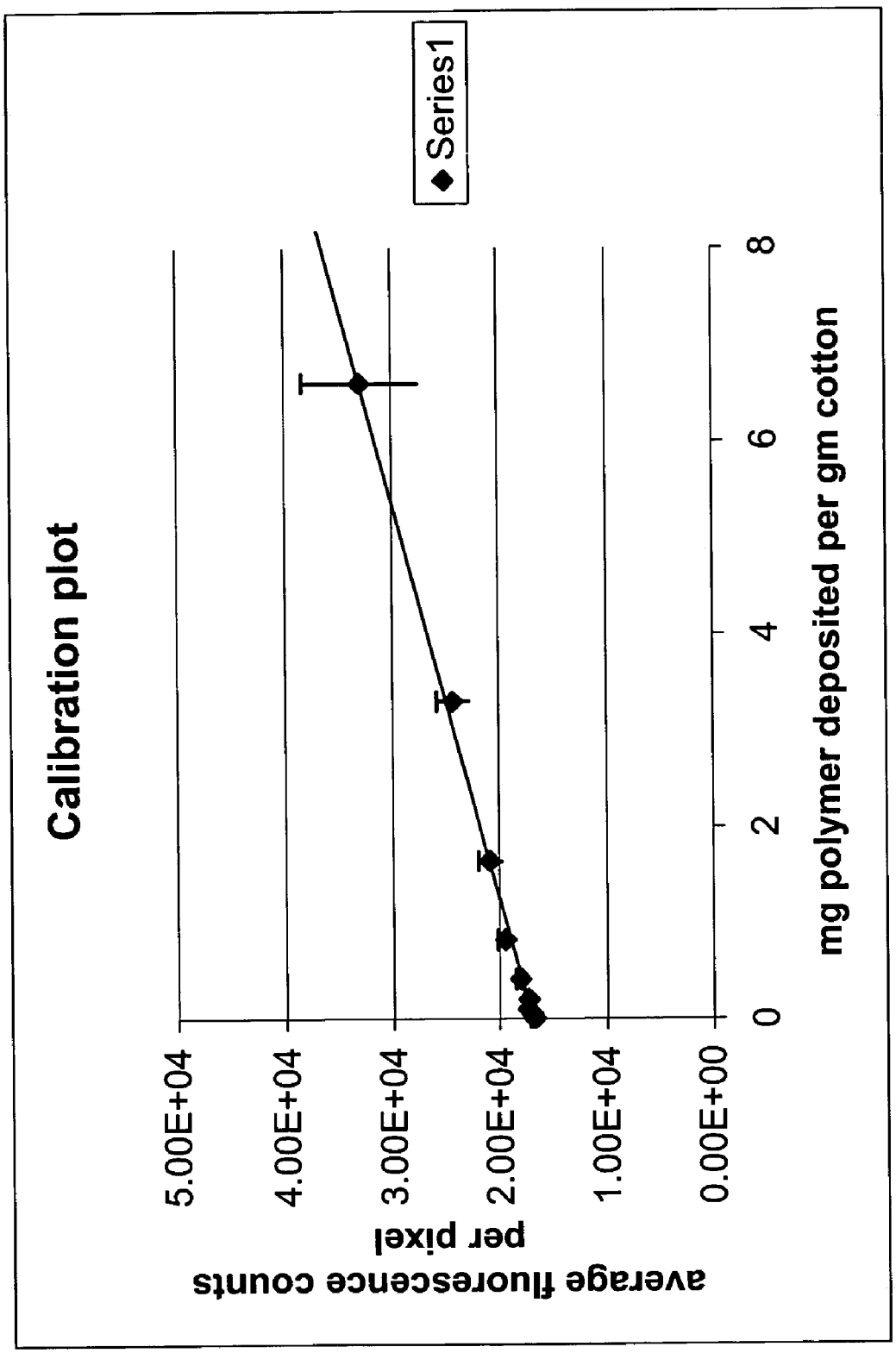
FIG. 3 is a graft of a calibration plot in connection with Example 2.

The calibration results are shown in Table 3 and FIG. 3. The fluorescence measurements for a given polymer concentration were averaged over the eight different polymers tested, which all contain approximately the same amount of fluorescent monomer per mass of polymer.

TABLE 3

| Solution mass fraction | volume deposited, ul | polymer mass deposited, mg | One cotton square mass | Mg polymer deposited per gm cotton | average counts per pixel | std. error, from 8 samples |
|---|---|---|---|---|---|---|
| 1.00E−02 | 5 | 5.00E−02 | 0.0075 | 6.67E+00 | 3.29E+04 | 1.90E+03 |
| 5.00E−03 | 5 | 2.50E−02 | 0.0075 | 3.33E+00 | 2.43E+04 | 5.13E+02 |
| 2.50E−03 | 5 | 1.25E−02 | 0.0075 | 1.67E+00 | 2.09E+04 | 3.70E+02 |
| 1.25E−03 | 5 | 6.25E−03 | 0.0075 | 8.33E−01 | 1.95E+04 | 2.52E+02 |
| 6.25E−04 | 5 | 3.13E−03 | 0.0075 | 4.17E−01 | 1.81E+04 | 1.45E+02 |
| 3.13E−04 | 5 | 1.56E−03 | 0.0075 | 2.08E−01 | 1.73E+04 | 1.34E+02 |
| 1.56E−04 | 5 | 7.81E−04 | 0.0075 | 1.04E−01 | 1.74E+04 | 9.26E+01 |
| 7.81E−05 | 5 | 3.91E−04 | 0.0075 | 5.21E−02 | 1.70E+04 | 7.32E+01 |
| 0.00E+00 | 5 | 0.00E+00 | 0.0075 | 0.00E+00 | 1.68E+04 | 1.13E+02 |

Referring to FIG. 3, a straight line was fit to the calibration data, yielding the relationship:

counts per pixel=$a+b$*(mg polymer/gram cotton)= 1.7$E$+04+1.97$E$+03*(mg polymer/gram cotton).

The paramter $a$ gives the number of counts observed for cotton squares carrying no dye, and contains contributions from the dark current of the CCD, any intrinsic fluorescence from the undyed fabric (including any chemicals used in manufacture and/or processing of the fabric), and any of the UV excitation which passes through the filter.

Figure 4:
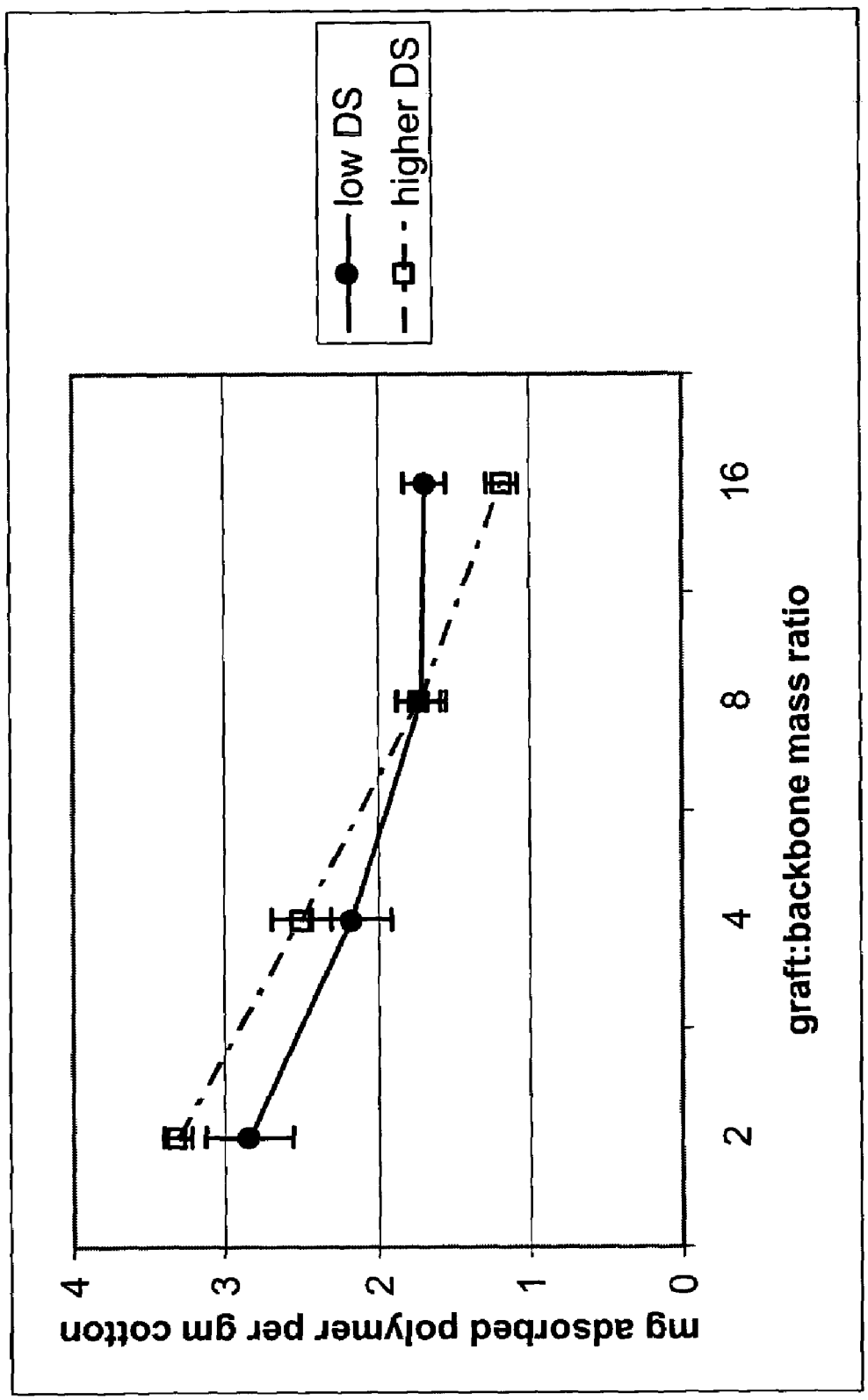
FIG. 4 is a graft showing the relationship between graft length in cellulosic graft polymer to adsorbancy on to cotton fibers.

In practice the value of $a$ was found to vary slightly from one fabric array to the next, and was determined for each fabric as an average divided by (or "over") all cells not carrying any dye (i.e., "blanks"). Thus for the test cells, to which the dye-tagged graft polymers were allowed to adsorb from solution, the amount of adsorbed polymer was determined from the averaged number of counts per pixel as mg polymer/gram cotton=(counts per pixel−$a$)/$b$ where the same slope value $b$=1970 was used for all samples, but the value of the intercept $a$ was determined from the blanks by averaging for each 8×12 fabric array tested. The results of processing this data are shown in FIG. 4 (in units of mg polymer/gram cotton), averaged over all four fabrics tested, and including error bars which represent the standard error calculated from the four measurements. As FIG. 4 demonstrates, the amount of adsorbed polymer decreases gradually as the length of the grafts is increased over a wide range.

Separate experiments were done in order to demonstrate that free dye in solution binds weakly or not at all to the cotton fabric, and that poly(dimethylacrylamide) homopolymers containing dye do not adsorb significantly to the cotton fabric.

Example 3

Effect of Graft Architecture on the Adsorbed Amount

A variety of different polymers were grafted from cellulose monoacetate (CMA), with different degrees of substitution of the grafts and different degrees of polymerization of the grafts. The monomers used for the grafts were dimethylacrylamide (DMA), trishydroxymethylmethylacrylamide (THMMA), Acrylamide methylpropane sulphonic acid triethylamine salt (AMPS:Et3N) and N-carboxymethyl dimethylaminopropyl acrylamide (N-carbDMAPA). The graft chains were present in seven different degrees of substitution across the bulk sample, namely DS of 0.012, 0.023, 0.04, 0.072, 0.125, 0.18 and 0.27. For each of the first 4 degrees of substitution, five graft polymers were prepared with different degrees of polymerization (DP) of the grafts, with DP's of 25, 50, 100, 200 and 400 being targeted. For each of the last 3 degrees of substitution, four graft polymers were prepared with different degrees of polymerization of the grafts, with DP's of 25, 50, 100 and 200 being targeted. The polymerization proceeded substantially according to the methods of Examples 1 and 2.

In this example, the control agent was one where "Z" was pyrrole (see scheme 6, above). 0.5 mol % of a fluorescent monomer (structure shown below) was incorporated in all the grafts

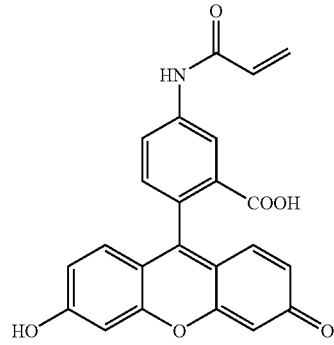

during polymerization of the grafts. CMA was used as a 20 wt % solution in DMF. Dimethylacrylamide was used a as 50% solution in DMF. Trishydroxymethylmethylacrylamide was used as a 20% solution in DMF. Acrylamidomethyl-propanesulfonicacid triethylamine salt was used as a 20% solution in DMF. N-CarboxymethylDimethylamino-propylacrylamide was used as a 20% solution in water. AIBN was used as a solution in DMF.

The following procedure is representative for the synthesis of all other polymers in this example: For CMA-DS-0.012 and monomer DMA at a DP=25: In an inert $N_2$ atmosphere CMA (89.21 mg) and dimethylacrylamide (10.79 mg) were mixed in a vial. To this AIBN (0.089 mg) was added and the mixture was heated to 65° C. and stirred for 18 hrs. The reaction mixture was then diluted to 10 wt % with DMF.

Other than DMF, the following Tables 4–10 provide the amounts of reactants used in each polymerization mixture:

TABLE 4

| DS | DP | CMA-Pyrrole-0.012 | AIBN | DMA | THMMA | AMPS:Et3N | N-CarbDMAPA |
|---|---|---|---|---|---|---|---|
| 0.012 | 25 | 89.21 | 0.089 | 10.79 | 0 | 0 | 0 |
| 0.012 | 50 | 80.53 | 0.161 | 19.47 | 0 | 0 | 0 |
| 0.012 | 100 | 67.41 | 0.27 | 32.59 | 0 | 0 | 0 |
| 0.012 | 200 | 50.84 | 0.407 | 49.16 | 0 | 0 | 0 |
| 0.012 | 400 | 34.08 | 0.546 | 65.92 | 0 | 0 | 0 |
| 0.012 | 25 | 82.41 | 0.083 | 0 | 17.59 | 0 | 0 |
| 0.012 | 50 | 70.09 | 0.14 | 0 | 29.91 | 0 | 0 |
| 0.012 | 100 | 53.95 | 0.216 | 0 | 46.05 | 0 | 0 |
| 0.012 | 200 | 36.94 | 0.296 | 0 | 63.06 | 0 | 0 |
| 0.012 | 400 | 22.65 | 0.363 | 0 | 77.35 | 0 | 0 |
| 0.012 | 25 | 72.7 | 0.073 | 0 | 0 | 27.3 | 0 |
| 0.012 | 50 | 57.1 | 0.114 | 0 | 0 | 42.9 | 0 |
| 0.012 | 100 | 39.96 | 0.16 | 0 | 0 | 60.04 | 0 |
| 0.012 | 200 | 24.97 | 0.2 | 0 | 0 | 75.03 | 0 |
| 0.012 | 400 | 14.27 | 0.229 | 0 | 0 | 85.73 | 0 |
| 0.012 | 25 | 80.31 | 0.08 | 0 | 0 | 0 | 19.69 |
| 0.012 | 50 | 67.1 | 0.134 | 0 | 0 | 0 | 32.9 |
| 0.012 | 100 | 50.49 | 0.202 | 0 | 0 | 0 | 49.51 |
| 0.012 | 200 | 33.77 | 0.271 | 0 | 0 | 0 | 66.23 |
| 0.012 | 400 | 20.32 | 0.325 | 0 | 0 | 0 | 79.68 |

TABLE 5

| DS | DP | CMA-Pyrrole-0.023 | AIBN | DMA | THMMA | N-carbDMAPA | AMPS:Et3N |
|---|---|---|---|---|---|---|---|
| 0.023 | 25 | 80.9 | 0.158 | 19.1 | 0 | 0 | 0 |
| 0.023 | 50 | 67.93 | 0.266 | 32.07 | 0 | 0 | 0 |
| 0.023 | 100 | 51.44 | 0.402 | 48.56 | 0 | 0 | 0 |
| 0.023 | 200 | 34.62 | 0.541 | 65.38 | 0 | 0 | 0 |
| 0.023 | 400 | 20.94 | 0.655 | 79.06 | 0 | 0 | 0 |
| 0.023 | 25 | 70.59 | 0.138 | 0 | 29.41 | 0 | 0 |
| 0.023 | 50 | 54.55 | 0.213 | 0 | 45.45 | 0 | 0 |
| 0.023 | 100 | 37.5 | 0.293 | 0 | 62.5 | 0 | 0 |
| 0.023 | 200 | 23.08 | 0.361 | 0 | 76.92 | 0 | 0 |
| 0.023 | 400 | 13.04 | 0.408 | 0 | 86.96 | 0 | 0 |
| 0.023 | 25 | 57.7 | 0.113 | 0 | 0 | 0 | 42.31 |
| 0.023 | 50 | 40.54 | 0.159 | 0 | 0 | 0 | 59.46 |
| 0.023 | 100 | 25.42 | 0.199 | 0 | 0 | 0 | 74.58 |
| 0.023 | 200 | 14.56 | 0.228 | 0 | 0 | 0 | 85.44 |
| 0.023 | 400 | 7.85 | 0.246 | 0 | 0 | 0 | 92.15 |
| 0.023 | 25 | 67.63 | 0.132 | 0 | 0 | 32.37 | 0 |
| 0.023 | 50 | 51.09 | 0.2 | 0 | 0 | 48.91 | 0 |
| 0.023 | 100 | 34.31 | 0.268 | 0 | 0 | 65.69 | 0 |
| 0.023 | 200 | 20.71 | 0.324 | 0 | 0 | 79.29 | 0 |
| 0.023 | 400 | 11.55 | 0.361 | 0 | 0 | 88.45 | 0 |

TABLE 6

| DS | DP | CMA-Pyrrole-0.04 | AIBN | DMA | THMMA | AMPS:Et3N | N-carbDMAPA |
|---|---|---|---|---|---|---|---|
| 0.04 | 25 | 68.54 | 0.261 | 31.46 | 0 | 0 | 0 |
| 0.04 | 50 | 52.14 | 0.396 | 47.86 | 0 | 0 | 0 |
| 0.04 | 100 | 35.26 | 0.536 | 64.74 | 0 | 0 | 0 |
| 0.04 | 200 | 21.41 | 0.651 | 78.59 | 0 | 0 | 0 |
| 0.04 | 400 | 11.99 | 0.729 | 88.01 | 0 | 0 | 0 |
| 0.04 | 25 | 55.24 | 0.21 | 0 | 44.76 | 0 | 0 |
| 0.04 | 50 | 38.16 | 0.29 | 0 | 61.84 | 0 | 0 |
| 0.04 | 100 | 23.58 | 0.359 | 0 | 76.42 | 0 | 0 |
| 0.04 | 200 | 13.37 | 0.406 | 0 | 86.63 | 0 | 0 |
| 0.04 | 400 | 7.16 | 0.436 | 0 | 92.84 | 0 | 0 |
| 0.04 | 25 | 41.22 | 0.157 | 0 | 0 | 58.78 | 0 |
| 0.04 | 50 | 25.96 | 0.197 | 0 | 0 | 74.04 | 0 |
| 0.04 | 100 | 14.92 | 0.227 | 0 | 0 | 85.08 | 0 |
| 0.04 | 200 | 8.06 | 0.245 | 0 | 0 | 91.94 | 0 |
| 0.04 | 400 | 4.2 | 0.255 | 0 | 0 | 95.8 | 0 |
| 0.04 | 25 | 51.8 | 0.197 | 0 | 0 | 0 | 48.2 |
| 0.04 | 50 | 34.95 | 0.266 | 0 | 0 | 0 | 65.05 |
| 0.04 | 100 | 21.18 | 0.322 | 0 | 0 | 0 | 78.82 |
| 0.04 | 200 | 11.84 | 0.36 | 0 | 0 | 0 | 88.16 |
| 0.04 | 400 | 6.29 | 0.383 | 0 | 0 | 0 | 93.71 |

TABLE 7

| DS | DP | CMA-Pyrrole-0.072 | AIBN | DMA | THMMA | N-carbDMAPA | AMPS:Et3N |
|---|---|---|---|---|---|---|---|
| 0.072 | 25 | 56.79 | 0.358 | 43.21 | 0 | 0 | 0 |
| 0.072 | 50 | 39.66 | 0.5 | 60.34 | 0 | 0 | 0 |
| 0.072 | 100 | 24.73 | 0.623 | 75.27 | 0 | 0 | 0 |
| 0.072 | 200 | 14.11 | 0.711 | 85.89 | 0 | 0 | 0 |
| 0.072 | 400 | 7.59 | 0.765 | 92.41 | 0 | 0 | 0 |
| 0.072 | 25 | 42.68 | 0.269 | 0 | 57.32 | 0 | 0 |
| 0.072 | 50 | 27.13 | 0.342 | 0 | 72.87 | 0 | 0 |
| 0.072 | 100 | 15.69 | 0.396 | 0 | 84.31 | 0 | 0 |
| 0.072 | 200 | 8.514 | 0.429 | 0 | 91.49 | 0 | 0 |
| 0.072 | 400 | 4.45 | 0.448 | 0 | 95.55 | 0 | 0 |
| 0.072 | 25 | 29.73 | 0.187 | 0 | 0 | 0 | 70.27 |
| 0.072 | 50 | 17.46 | 0.22 | 0 | 0 | 0 | 82.54 |
| 0.072 | 100 | 9.56 | 0.241 | 0 | 0 | 0 | 90.44 |
| 0.072 | 200 | 5.02 | 0.253 | 0 | 0 | 0 | 94.98 |
| 0.072 | 400 | 2.58 | 0.26 | 0 | 0 | 0 | 97.42 |
| 0.072 | 25 | 39.33 | 0.248 | 0 | 0 | 60.67 | 0 |
| 0.072 | 50 | 24.48 | 0.309 | 0 | 0 | 75.52 | 0 |
| 0.072 | 100 | 13.94 | 0.352 | 0 | 0 | 86.06 | 0 |
| 0.072 | 200 | 7.5 | 0.378 | 0 | 0 | 92.5 | 0 |
| 0.072 | 400 | 3.89 | 0.393 | 0 | 0 | 96.11 | 0 |

TABLE 8

| DS | DP | CMA-Pyrrole-0.125 | AIBN | DMA | THMMA | N-carbDMAPA | AMPS:Et3N |
|---|---|---|---|---|---|---|---|
| 0.125 | 25 | 43.69 | 0.466 | 56.31 | 0 | 0 | 0 |
| 0.125 | 50 | 27.95 | 0.597 | 72.05 | 0 | 0 | 0 |
| 0.125 | 100 | 16.25 | 0.694 | 83.75 | 0 | 0 | 0 |
| 0.125 | 200 | 8.84 | 0.755 | 91.16 | 0 | 0 | 0 |
| 0.125 | 25 | 30.53 | 0.326 | 0 | 69.47 | 0 | 0 |
| 0.125 | 50 | 18.02 | 0.385 | 0 | 81.98 | 0 | 0 |
| 0.125 | 100 | 9.9 | 0.423 | 0 | 90.1 | 0 | 0 |
| 0.125 | 200 | 5.21 | 0.445 | 0 | 94.79 | 0 | 0 |
| 0.125 | 25 | 19.98 | 0.213 | 0 | 0 | 0 | 80.02 |
| 0.125 | 50 | 11.1 | 0.237 | 0 | 0 | 0 | 88.9 |
| 0.125 | 100 | 5.88 | 0.251 | 0 | 0 | 0 | 94.12 |
| 0.125 | 200 | 3.03 | 0.259 | 0 | 0 | 0 | 96.97 |
| 0.125 | 25 | 27.68 | 0.295 | 0 | 0 | 72.32 | 0 |
| 0.125 | 50 | 16.06 | 0.343 | 0 | 0 | 83.84 | 0 |
| 0.125 | 100 | 8.73 | 0.373 | 0 | 0 | 91.27 | 0 |
| 0.125 | 200 | 4.57 | 0.39 | 0 | 0 | 95.43 | 0 |

TABLE 9

| DS | DP | CMA-Pyrrole-0.18 | AIBN | DMA | THMMA | N-carbDMAPA | AMPS:Et3N |
|---|---|---|---|---|---|---|---|
| 0.18 | 25 | 38.56 | 0.509 | 61.44 | 0 | 0 | 0 |
| 0.18 | 50 | 23.89 | 0.63 | 76.11 | 0 | 0 | 0 |
| 0.18 | 100 | 13.56 | 0.716 | 86.44 | 0 | 0 | 0 |
| 0.18 | 200 | 7.28 | 0.768 | 92.72 | 0 | 0 | 0 |
| 0.18 | 25 | 26.23 | 0.346 | 0 | 73.77 | 0 | 0 |
| 0.18 | 50 | 15.09 | 0.398 | 0 | 84.91 | 0 | 0 |
| 0.18 | 100 | 8.16 | 0.431 | 0 | 91.84 | 0 | 0 |
| 0.18 | 200 | 4.26 | 0.449 | 0 | 95.74 | 0 | 0 |
| 0.18 | 25 | 16.81 | 0.222 | 0 | 0 | 0 | 83.19 |
| 0.18 | 50 | 9.17 | 0.242 | 0 | 0 | 0 | 90.83 |
| 0.18 | 100 | 4.81 | 0.254 | 0 | 0 | 0 | 95.19 |
| 0.18 | 200 | 246 | 0.26 | 0 | 0 | 0 | 97.54 |
| 0.18 | 25 | 23.64 | 0.312 | 0 | 0 | 76.36 | 0 |
| 0.18 | 50 | 13.4 | 0.354 | 0 | 0 | 86.6 | 0 |
| 0.18 | 100 | 7.18 | 0.379 | 0 | 0 | 92.82 | 0 |
| 0.18 | 200 | 3.73 | 0.393 | 0 | 0 | 96.27 | 0 |

TABLE 10

| DS | DP | CMA-Pyrrole-0.27 | AIBN | DMA | THMMA | N-carbDMAPA | AMPS:Et3N |
|---|---|---|---|---|---|---|---|
| 0.27 | 25 | 32.35 | 0.56 | 67.65 | 0 | 0 | 0 |
| 0.27 | 50 | 19.3 | 0.668 | 80.7 | 0 | 0 | 0 |
| 0.27 | 100 | 10.68 | 0.74 | 89.32 | 0 | 0 | 0 |

TABLE 10-continued

| DS | DP | CMA-Pyrrole-0.27 | AIBN | DMA | THMMA | N-carbDMAPA | AMPS:Et3N |
|---|---|---|---|---|---|---|---|
| 0.27 | 200 | 5.64 | 0.782 | 94.36 | 0 | 0 | 0 |
| 0.27 | 25 | 21.32 | 0.369 | 0 | 78.68 | 0 | 0 |
| 0.27 | 50 | 11.93 | 0.413 | 0 | 88.07 | 0 | 0 |
| 0.27 | 100 | 6.34 | 0.439 | 0 | 93.66 | 0 | 0 |
| 0.27 | 200 | 3.28 | 0.454 | 0 | 96.72 | 0 | 0 |
| 0.27 | 25 | 13.34 | 0.231 | 0 | 0 | 0 | 86.66 |
| 0.27 | 50 | 7.15 | 0.248 | 0 | 0 | 0 | 92.85 |
| 0.27 | 100 | 3.71 | 0.257 | 0 | 0 | 0 | 96.29 |
| 0.27 | 200 | 1.89 | 0.262 | 0 | 0 | 0 | 98.11 |
| 0.27 | 25 | 19.08 | 0.331 | 0 | 0 | 80.92 | 0 |
| 0.27 | 50 | 10.55 | 0.365 | 0 | 0 | 89.45 | 0 |
| 0.27 | 100 | 5.57 | 0.386 | 0 | 0 | 94.43 | 0 |
| 0.27 | 200 | 2.86 | 0.397 | 0 | 0 | 97.14 | 0 |

Conversions were spot checked by NMR for selected samples and graft polymers of DMA and TRIS were analyzed by aqueous GPC. The DS for grafts across the bulk sample was measured by NMR according to the discussion in this specification. Each polymerization resulted in a cellulose monoacetate graft polymer. The amount of monomer in the polymerization mixture determined the graft length.

Using the parallel deposition contacting apparatus and method described in Example 2, after synthesis, the reaction mixtures were topped off with solvent to bring the total polymer concentration to a nominal value of 12.5 wt % in all wells (100 mg polymer in 800 ul solvent). These solutions were used without any subsequent purification to remove solvent, unreacted monomer, etc. The polymers were diluted in two steps to achieve an ultimate concentration of 200 ppm by weight in a buffered surfactant solution. The composition of the surfactant solution is as follows, with the solvent being demineralized water:
0.6 g/L LAS anionic surfactant
0.4 g/L R(EO)$_7$
1.25 g/L Na$_2$CO$_3$—JT Baker #3604-01
0.66 g/L STP
0.6 g/L NaCl
0.0882 g/L CaCl$_2$2H$_2$O—Sigma #C-8106
pH=10.5.

In the first dilution step, 32 ul of each polymer solution was added to 2 ml of the surfactant solution, in a 2 ml capacity 96-well polypropylene microtiter plate. This gave an initial dilution of 1:62.5, for a polymer concentration of 0.2 wt %. The solutions were mixed by multi-well magnetic stirring. In the second dilution step, 40 ul of the 0.2 wt % solutions and 360 ul of the surfactant solution were added together directly in the apparatus used for screening adsorption in parallel format (described in Example 2). The final polymer concentration is thus a nominal 0.02 wt % or 200 ppm by weight.

The liquids (sample/surfactant solutions) were flowed through the fabrics for 1 hour at room temperature, with a flow cycle time of approximately 0.5 seconds per complete cycle. After one hour, the free liquid in the cells was poured off, and the apparatus was immersed briefly in tap water to further remove free polymer solution. The blocks were then separated, and the fabrics were removed, separated, and thoroughly rinsed in 6 liters of tap water. The fabrics were allowed to air dry for 24 hours.

Each square of the test fabrics has a mass of approximately 7.5 mg, so the total fabric mass per well is approximately 45 mg. The mass of sample/surfactant solution in each well is approximately 400 mg (400 ul volume), containing a polymer mass fraction of 0.02% or a polymer mass of 0.08 mg. Thus the maximum amount of polymer which can be deposited on the fabric is 0.08 mg/45 mg=1.8 mg polymer per gram of fabric. In order to calculate from the fluorescence signals the amount of polymer actually deposited from the wash, additional fabrics were prepared by directly depositing controlled amounts of the polymers on squares of the test fabrics. The solutions at 0.2 wt % polymer were used for this purpose. A volume of approximately 3.5 ul of each solution was deposited, carrying a total polymer mass of 0.007 mg and giving polymer deposition relative to the fabric in the amount (0.007 mg polymer per square)/(7.5 mg fabric per square)≈0.9 mg/gm. This is one half the maximum possible amount of polymer that could be deposited under the test conditions.

The amount of deposited polymer was determined by fluorescence imaging as described in Example 2, but in this example, the f-stop value was f4 and the exposure time was 500 msec. A background image was obtained by taking an exposure with the UV illumination turned off. The effects of non-uniform UV illumination were accounted for by imaging a uniform fluorescent target (Peel-N-Stick Glow Sheeting, manufactured by ExtremeGlow, http://www.extremeglow.com) under the same irradiation and exposure conditions used for imaging the fabrics. The number of counts in a pixel in an experiment image was corrected by first subtracting the number of counts in the corresponding background image pixel, and then dividing by the number of counts in the corresponding uniform target image pixel.

The corrected images were analyzed on a computer using a program that allows the user to define a centroid position for the top left and bottom right library element. Centroids for the remaining elements are then automatically generated using a simple gridding algorithm. The user also manually defines the size of a circular area around each centroid which is to be included in the analysis. Both the total number of counts within the sampled area and the average counts per pixel are calculated and stored, for each element in the grid. The latter number is used for comparisons between libraries, since the sampling area is set manually and is not necessarily constant from one library to the next. See, for example, WO 00/60529 for disclosure of such a program, which is incorporated herein by reference.

Figures 5A, 5B:
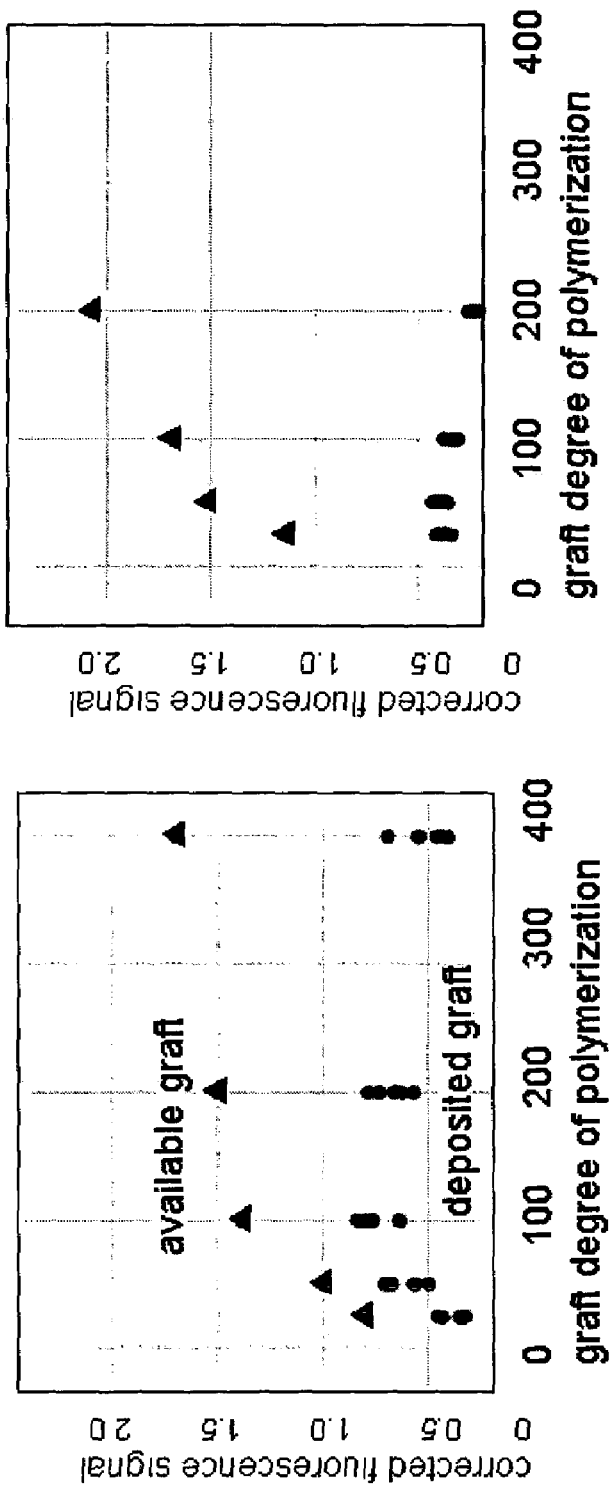
FIGS. 5A and 5B are each graphs showing selected experimental results from Example 3, with FIG. 5A showing the amount of cellulosic graft THMMA polymer with a degree of substitution of 0.023 deposited onto cotton fibers after a treatment process and Figure showing results of a similar experiment showing the amount of cellulosic graft THMMA polymer with a degree of substitution of 0.18 deposited onto cotton fibers after a treatment process.

FIG. 5 shows a subset of the data, where DS is equal to 0.023 (FIG. 5A) and 0.18 (FIG. 5B). The lower points in each plot represent the signal from the experimental samples, and the upper points (shown as triangles "▲") represent twice the signal from the control samples, i.e., the signal which would occur if all polymer were deposited. The upper points thus represent the amount of graft available in solution, and the lower points represent the amount of graft actually deposited on the fabric from the deposition step. From FIG. 5A, the amount of deposited grafted polymer reaches a maximum at about DP=100 and then decreases, even though the amount of graft available for deposition continues to increase. From FIG. 5B, the amount of deposited graft polymer is much less than for DS=0.023, even though the amount of available graft is in all cases larger. Also the amount of deposited polymer essentially decreases monotonically with increasing DP, even though the amount of available graft is increasing monotonically. Similar data was obtained for the other tested graft polymers in this example, for example for dimethylacrylamide grafts, with DS values of 0.012 and 0.125, the trends of available vs. adsorbed polymer were similar to those observed for THMMA grafts.

Figure 6:
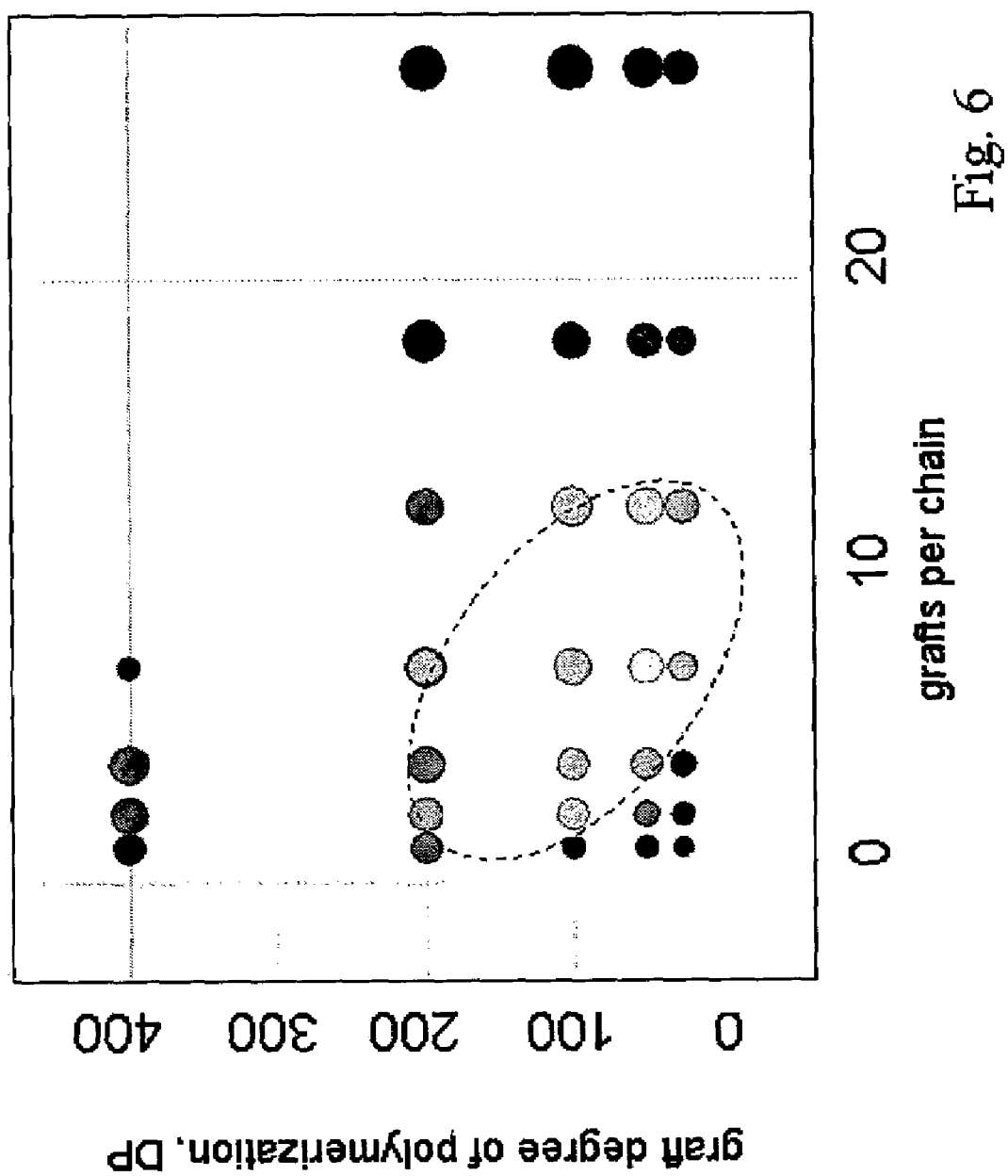
FIG. 6 is a plot of grafts per chain versus graft degree of polymerization from Example 3.

FIG. 6 summarizes the results for all of the polymers with THMA grafts. The x-axis is the number of grafts per chain (=DS*100) and the y-axis is the targeted graft degree of polymerization, DP. The size of the data points is proportional to twice the signal from the "control" sample, and the relative shade of the data points represents the fluorescence signal from the experimental samples. The size of the points increases monotonically with both DP and DS, because the graft makes up a larger fraction of the polymer as each of these variables increases. The region where the point interiors are lighter represents the region in which the deposition of the grafts is optimized or maximized. An oval has been drawn in FIG. 6 around the region where an anti-correlation exists between the optimum values of DS and DP—as DS is increased, the value of DP which gives optimum deposition decreases, which represents the approximate region where strong deposition occurs. Thus in some embodiments a graft copolymer having a DS of from 0.1 to 1.0 and a DP from 5 to 50 is within the scope of this invention.

It is to be understood that the above description is intended to be illustrative and not restrictive. Many embodiments will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated herein by reference for all purposes.

What is claimed is:

1. A polymer comprising,
   a polymeric backbone selected from the group consisting of cellulose, modified cellulose and hemi-cellulose;
   at least one pendant polymeric chain attached to said polymeric backbone, wherein on average there are between 0.5 and 25 pendant polymeric chains attached to said polymeric backbone at a site selected from the group consisting of a terminus of said polymeric backbone and a mid-point of said polymeric backbone and combinations thereof;
   wherein said at least one pendant polymeric chain has a number average molecular weight of from 100 to 10,000,000 Da; and
   wherein said cellulosic backbone has a number average molecular weight of from about 3,000 to about 100,000.

2. The polymer of claim 1, wherein said cellulosic backbone is selected from the group consisting of xyloglucan, locust bean gum, glucomannan and cellulose monoacetate.

* * * * *